US010021093B2

(12) United States Patent
Barry et al.

(10) Patent No.: US 10,021,093 B2
(45) Date of Patent: Jul. 10, 2018

(54) SYSTEM AND METHOD FOR COMMUNICATING CREDENTIALS

(71) Applicant: Priviti Pte. Ltd., Singapore (SG)

(72) Inventors: Gerard Barry, Galway (IE); Declan Barry, Singapore (SG)

(73) Assignee: PRIVITI PTE LTD, Singapore (SG)

( * ) Notice: Subject to any disclaimer, the term of this patent is extended or adjusted under 35 U.S.C. 154(b) by 0 days.

(21) Appl. No.: 15/110,357

(22) PCT Filed: Jan. 9, 2015

(86) PCT No.: PCT/EP2015/050354
§ 371 (c)(1),
(2) Date: Jul. 7, 2016

(87) PCT Pub. No.: WO2015/104387
PCT Pub. Date: Jul. 16, 2015

(65) Prior Publication Data
US 2016/0337345 A1    Nov. 17, 2016

(30) Foreign Application Priority Data

Jan. 10, 2014  (EP) .................................. 14150856

(51) Int. Cl.
*G06F 7/04*    (2006.01)
*H04L 29/06*   (2006.01)
(Continued)

(52) U.S. Cl.
CPC ...... *H04L 63/0853* (2013.01); *G06F 21/6245* (2013.01); *G06Q 20/206* (2013.01);
(Continued)

(58) Field of Classification Search
CPC ... H04L 63/0853; H04L 63/04; H04L 63/102; G06F 21/6245; G06Q 20/327; G06Q 20/206; G06Q 20/401
(Continued)

(56) References Cited

U.S. PATENT DOCUMENTS

| 2005/0006950 A1 | 1/2005 | Versteyhe |
| 2011/0185174 A1 | 7/2011 | Blewett et al. |

(Continued)

FOREIGN PATENT DOCUMENTS

| JP | 2007073040 A | 3/2007 |
| JP | 2008027323 A | 2/2008 |

(Continued)

OTHER PUBLICATIONS

Intellectual Property Office of Singapore Search Report, SG Application No. 11201605576R, dated Jul. 3, 2017, total of 2 pages.
(Continued)

*Primary Examiner* — Aravind K Moorthy
(74) *Attorney, Agent, or Firm* — Saliwanchik, Lloyd & Eisenschenk

(57) ABSTRACT

A system and method for conducting transactions involving the communication of credentials connected to an entity or an individual, known as the presenter to a permitted destination, known as the network endpoint (110) following a request from an accepter while maintaining the privity in said credentials. The system includes presenting appliances (108) and accepting appliances (109) that communicate with a controlling server (101). The controlling server receives communication from the accepting and presenting appliances that contains a secret keycode exclusive to the individual or presenter, presenter identifiers and a shared key-
(Continued)

code and if the communications are matched, credentials specific to presenter identifier is permitted to be released to a known network endpoint.

36 Claims, 17 Drawing Sheets

(51) Int. Cl.
| | |
|---|---|
| *H04L 9/32* | (2006.01) |
| *G06F 21/00* | (2013.01) |
| *G06F 21/62* | (2013.01) |
| *G06Q 20/20* | (2012.01) |
| *G06Q 20/32* | (2012.01) |
| *G06Q 20/40* | (2012.01) |

(52) U.S. Cl.
CPC ......... *G06Q 20/327* (2013.01); *G06Q 20/401* (2013.01); *H04L 63/04* (2013.01); *H04L 63/102* (2013.01)

(58) Field of Classification Search
USPC .................. 726/7, 26; 713/165, 168, 182
See application file for complete search history.

(56) References Cited

U.S. PATENT DOCUMENTS

| | | |
|---|---|---|
| 2012/0284786 A1 | 11/2012 | Somani et al. |
| 2013/0120110 A1* | 5/2013 | Kalous ............. G05B 1/01 340/5.54 |
| 2013/0191893 A1* | 7/2013 | Sutton ............. G06F 21/31 726/6 |
| 2013/0246203 A1 | 9/2013 | Laracey |

FOREIGN PATENT DOCUMENTS

| | | |
|---|---|---|
| JP | 2011034223 A | 2/2011 |
| JP | 2011128967 A | 6/2011 |
| JP | 2012027582 A | 2/2012 |
| WO | WO 2004/049621 A1 | 6/2004 |
| WO | WO 2013/034192 A1 | 3/2013 |

OTHER PUBLICATIONS

Intellectual Property Office of Singapore Written Opinion, SG Application No. 11201605576R, dated Jul. 4, 2017, total of 6 pages.
Japanese Patent Office Decision to Grant a Patent, JP Application No. 2016-545876, dated May 23, 2017, total of 6 pages.

* cited by examiner

Fig. 7A

| Ref_701 | Ref_702 | Ref_703 |
|---|---|---|
| (definition) Interactor Identifier | (permission) Secret KeyCode | (location) Connected Credentials |
| presenter_A | ****** | XXXXXXXXXXXXXXXXXX... |
| .. | .. | .. |
| .. | .. | .. |
| presenter_F | ********** | XXXXXXXXXXXXXXXXXX... |
| presenter_C | ******* | XXXXXXXXXXXXXXXXXX... |
| presenter_H | ********* | XXXXXXXXXXXXXXXXXX... |
| .. | .. | .. |
| presenter_B | ********** | XXXXXXXXXXXXXXXXXX... |

| Ref_701 | Ref_702 | Ref_703 |
|---|---|---|
| (definition)<br>Interactor Identifier | (permission)<br>Secret KeyCode | (location)<br>Connected Credentials |
| 8c48847bcc... | s2YisvHPL+... | %B555555... |
| .. | .. | .. |
| .. | .. | .. |
| 9415bfefcc... | 0a5lYaQqR9... | P<XXXBLOGGS<<JOHN... |
| d299997ce5... | tncmmXw3Qp... | %B444444... |
| c4345d0f05... | uGkM35SWPs... | %Z999999... |
| .. | .. | .. |
| .. | .. | .. |
| c4e417c0f9... | LBUcbRQmIP... | https://registry?... |

| Ref_701 (definition) Interactor Identifier | Ref_704 (distinction) Aliased Associated | Ref_702 (permission) Secret KeyCode | Ref_703 (location) Connected Credentials |
|---|---|---|---|
| presenter_A | a3 | ******* | XXXXXXXXXXXXXXXX... |
| presenter_A | a4 | ******* | XXXXXXXXXXXXXXXX... |
| presenter_A | a6 | ******* | XXXXXXXXXXXXXXXX... |
| presenter_F | | ********** | XXXXXXXXXXXXXXXX... |
| presenter_C | c8 | ******* | XXXXXXXXXXXXXXXX... |
| presenter_C | c10 | ********** | XXXXXXXXXXXXXXXX... |
| presenter_Z | | ********** | XXXXXXXXXXXXXXXX... |
| presenter_B | b55 | ********* | XXXXXXXXXXXXXXXX... |
| presenter_B | b41 | ********* | XXXXXXXXXXXXXXXX... |

(1 – n)

List of Presenting Interactors

| Ref_701<br>(definition)<br>Interactor<br>Identifier | Ref_702<br>(permission)<br>Secret<br>KeyCode | Ref_703<br>(location)<br>Connected<br>Credentials |
|---|---|---|
| presenter_A | ****** | XXXXXXXXXX... |
| : | : | : |
| : | : | : |
| presenter_F | ******** | XXXXXXXXXX... |
| presenter_C | ****** | XXXXXXXXXX... |
| presenter_H | ********** | XXXXXXXXXX... |
| : | : | : |
| presenter_B | ******** | XXXXXXXXXX... |
| : | : | : |

(1 - n)

List of Accepting Interactors

| Ref_801<br>(subscription)<br>Interactor<br>Identifier | Ref_802<br>(destination)<br>Engaged Endpoint or<br>Accepting Appliance |
|---|---|
| accepter_M | XXXXXXXXXX... |
| : | : |
| accepter_X | XXXXXXXXXX... |
| accepter_W | XXXXXXXXXX... |
| : | : |
| accepter_K | XXXXXXXXXX... |
| accepter_Z | XXXXXXXXXX... |
| : | : |

SYSTEM AND METHOD FOR COMMUNICATING CREDENTIALS

CROSS REFERENCE TO RELATED APPLICATIONS

This application is a National Stage Application of International Application Number PCT/EP2015/050354, filed Jan. 9, 2015; which claims priority to European Application No. 14150856.4, filed Jan. 10, 2014; both of which are incorporated herein by reference in their entirety.

FIELD OF THE INVENTION

The present invention pertains to the field of information and communication technology, privity of data exchange entrusted to information and communication technology, as well as' preserving and protecting the privity prevailing in credentials communicated with information and communication technology. Privity refers to the possession of or participation in any information that pertains to an entity, or any set of credentials connecting an entity and any particular individual. In particular, the present invention is concerned with, but not limited to permitted release of data comprising sets of private personal particulars and controlled credentials that a party to whom the credential set pertains, may wish consent and permit to have confidentially released in a protected and secure manner whilst ensuring the ongoing preservation and maintenance of the confidentiality and privacy of the personal particulars and controlled credentials for a variety of purposes. Controlled credentials refer, to such information connecting the owner/issuer of the controlled credentials and the holder/possessor of the controlled credentials.

BACKGROUND TO THE INVENTION

In modern society, individuals are associated with a vast array of personal data. Some examples of such personal data include but are not limited to name, address, date of birth, nationality, social security number, passport number, driver's license number, membership number (for a given organization), maiden name (if applicable), mother's maiden name, employer information, bank account number, credit card number etc. This personal data is used in a multitude of ways as and when individuals interact with other individuals and organizations. Many of these interactions depend heavily on the accuracy of a data set that is both particular to the individual and necessary for the interaction in question. Accordingly, because each such data set (hereafter referred to as a "credential set") is both particular to an individual and necessary for the interaction, it is sensitive information that desirably is retained in a state of privity. The information is sensitive (and desirably retained in a state of privity) additional relevant data, such as data pertaining to additional security features, for example, a secret keycode associated with a given instrument. It will be understood that even if it is intended to release a credential set from a record, it may be necessary to ensure that the associated data is never released, particularly where it pertains to additional security features.

Such record registries are typically populated in the following way. The credential set pertaining to a presenter is furnished to the controller and the credential set is verified and validated. Once the credential set is verified and validated, an instrument is produced bearing the credential set, and this credential set is provided to the presenter. The credential set is also entered into a new record on the record registry and typically supplemented with any data pertaining to the corresponding instrument (such as serial number, etc.) and any other relevant data (such as additional security feature data including but not limited to biometrics etc.).

Ways have evolved to render credential sets onto such bespoke instruments. Historically, such data may have been inked, typed or labeled on the issued instrument. Subsequently, such data may have been embossed or engraved or encoded or embedded on the issued instrument. More recently, machine readable media (such as magnetic stripes or chips) have been used as instruments, the relevant credential sets being stored electronically on such media. The format of many instruments (and the format in which credential sets are stored thereon) is governed by the International Organization for Standardization. For example, ISO 7501 governs the format of Machine readable travel documents; ISO 7810 and ISO 7811 govern the format of Identification Cards; and ISO 7812 and ISO 7816 govern the manner in which cards may be provided from different issuers.

In spite of advances in the provision of instruments bearing presenter credential sets, there remains the danger of fraud. It remains necessary to be able to both verify that the presenter bearing the instrument comprising the credential set is the valid/authentic presenter (i.e. that the instrument has not been stolen or cloned and hence is not being used fraudulently) and also to verify that the proffered instrument comprising the credential set is indeed authentic (i.e. that the credentials are accurate and that the instrument is not a complete forgery). This is an issue of increasing concern as bearers of such instruments release their credential sets on an increasingly frequent basis. While the credential sets are initially held in an environment of confidentially/privacy, existing between the presenters of credential sets and their controllers, this environment of confidentially/privacy is jeopardized whenever the credential set is released during an exchange with a third party. While improvements in the security of the means by which credential sets are released have sought to bolster this environment of confidentially/privacy, weaknesses still persist.

For example, with even with the advent of automated systems for reading passport instruments, when a passenger presents their passport to any check point officer or any border control agency (the "accepter"), the controlled credentials on the issued instrument are visible to and handled by the accepter prior to and after capturing the controlled credentials in the reading device. If—in contravention of privacy policy said credentials as viewed are copied and shared by the accepter, not just captured and processed, the state of privity in which the passport instrument credentials originally resided is compromised. Similar deficiencies exist for other instruments for which automated credential capture systems have been developed, such as driving licenses, loyalty/membership cards, and payment cards.

There remains a need for improved methods and systems by which presenters may proffer credential sets during exchanges with other individuals or organizations in a manner that guarantees both the authenticity of the credential set, and the authenticity of the presenter bearing the credential set. It would be highly desirable to provide methods and systems that ensure an environment of complete confidentially/privacy for credential sets when being disclosed. It would be strongly preferable for any such improved methods and systems to be backwardly compatible with existing methods and systems that are in common usage such that the improved methods and systems may be phased in smoothly and gradually. This would be highly advantageous as it would eliminate the need for costly and time-consuming transitions to new systems and methods. It would further be preferable for any new improved methods and systems to be scalable such that they may cater for a plurality of diverse credential sets through a single system and method.

SUMMARY OF THE INVENTION

An aspect of the invention comprises a system for permitting a communication of at least one set of controlled credentials connected to a presenter, to a network endpoint, while maintaining privity prevailing in said controlled credentials connected to the presenter, wherein the system comprises at least one accepting appliance, at least one presenting appliance, at least one network endpoint and at least one server, and wherein one of said servers comprise one or more records. Each record pertains to a given presenter, comprises a presenter identifier, and a secret keycode bound to each presenter identifier, and is affiliated with at least one entry pertaining to a set of controlled credentials connected to the presenter. Each entry pertains to at least one set of credentials associated with said given presenter. Each entry may also pertain to at least one alias, each alias connected respectively with one of said sets of credentials. Each network endpoint is a designated recipient of a type of controlled credentials connected to presenters, said endpoint being either the accepting appliance or that of a designated third party linked to the accepting appliance; wherein permitting a communication of at least one set of controlled credentials connected to the presenter is performed in the context of an interaction between the presenting interactor and the accepting interactor; and wherein the credential set to which the permission pertains is associated with the presenting interactor. One of said servers functions as a controlling server further configured to (a) receive a communication from an accepting appliance hereinafter referred to as an accepting appliance communication, said communication containing a secret keycode pertaining to the presenter and a once-off shared keycode; (b) receive a communication from a presenting appliance hereinafter referred to as a presenting appliance communication, said communication containing a presenter identifier pertaining to the presenter and a once-off shared keycode; (c) seek to match the once-off shared keycode contained in the accepting appliance communication and the corresponding once-off shared keycode contained in the presenting appliance communication; (d) initiate a search for a target record by linking the secret keycode contained in said accepting appliance communication and the presenter identifier contained in said presenting appliance communication, wherein both said communications contain the same shared keycode; (e) conduct a search for said target record that comprises both said secret keycode and said presenter identifier; (f) identify an entry affiliated with said target record, said entry pertaining to a set of controlled credentials connected to the presenter; (g) permit the retrieval of said credential set pertaining to said entry and permit the release of said credential set to said network endpoint, said endpoint being the permitted recipient of a set of controlled credentials connected to said presenter, and said endpoint being either the accepting appliance or that of a designated third party linked to the accepting appliance[2].

Another aspect of the invention comprises a method to permit a communication of at least one set of controlled credentials connected to a presenter, from a server to a network endpoint, while maintaining the privity prevailing in said controlled credentials connected to the presenter; and wherein a server comprises one or more records, each record pertaining to a presenter (given party enrolled with the server as a presenter and/or as an accepter), and each record comprising a presenter identifier (and/or accepter identifier[4]) and a (presenter and/or accepter[4]) secret keycode bound to said presenter identifier, and each record is affiliated with an entry pertaining to a set of controlled credentials (associated with said party[4]) connected to said presenter; the method comprising: (a) at an accepting appliance, making a once-off shared keycode available to a/the presenting interactor; (b) at the accepting appliance, receiving a (presenter[4]) secret keycode pertaining to the presenting interactor wherein said (presenter[4]) secret keycode is input at the accepting appliance by the presenting interactor; (c) at the accepting appliance, communicating an accepting appliance communication to at least one of the servers, said accepting appliance communication containing the once-off shared keycode and the (presenter[4]) secret keycode; (d) at a presenting appliance of the presenting interactor, receiving the once off shared keycode; (e) at the presenting appliance, retrieving a presenter identifier pertaining to the presenting interactor from a storage location on the presenting appliance; and (f) at the presenting appliance, communicating a presenting appliance communication to said server, said presenting appliance communication containing the once-off shared keycode and the presenter identifier, wherein (g) upon receipt of said accepting appliance communication and said presenting appliance communication, at a the server processing the communications to ascertain if it is permitted to communicate a set of controlled credentials connected to the presenter, thereby permitting its retrieval at a server and thereby permitting its release to a network endpoint, said endpoint being a permitted recipient, and said endpoint being either the accepting appliance or that of a designated third party linked to the accepting appliance.

In an aspect of the invention, all credential sets connected to the presenter (or aliases affiliated to credential sets) may be comprised as entries in said record.

In another aspect of the invention, all credential sets connected to the presenter (and aliases affiliated) may be comprised as separate entries on a different server communicable with a controlling server. Alternatively, some credential sets connected to the presenter and aliases affiliated may be comprised as entries in said record, whereas others may be comprised as separate entries on said server or separate entries on different severs.

The accepting appliance communication may be communicated to said server* over a first communication channel and the presenting appliance communication may be communicated to said server over a second communication channel.

In an aspect of the invention, the once-off shared keycode may be generated at the server* and communicated to the accepting appliance before said once-off shared keycode is made available to the presenting interactor or/and the presenting appliance.

In another aspect of the invention, the once-off shared keycode may be generated at the accepting appliance before said once-off shared keycode is made available to the presenting interactor or/and the presenting appliance.

A copy of the once-off shared keycode may be communicated from the accepting appliance to the presenting appliance via a wireless technology, the wireless technology optionally selected from a group comprising Wifi, bluetooth, NFC or RFID.

In an aspect of the invention, a validity period may be assigned to the accepting appliance communication and presenting appliance communications and/or the shared keycode. This ensures that if an accepting appliance communication is not matched to a presenting appliance communication as discussed below within a certain timeframe (the validity period), then such communication lapses and thereby becomes void rendering further processes redundant. Where such communication lapses and becomes void rendering further processes redundant, the data pertaining to the communication can be purged, freeing up resources for the processing of further communications. Where communications are generated, transmitted or received, containing shared keycodes bearing a validity period, the validity period can ensure that shorter, less complex shared keycodes can be used because shared keycode re-use is thereby feasible. Upon expiry of the validity period of a shared keycode, the same shared keycode may be re-used in a subsequent iteration of the method.

In an aspect of the invention a copy of the once-off shared keycode may be made available to the presenting interactor or/and presenting appliance via a screen comprised in the accepting appliance or on a printout from the accepting appliance, wherein either: (a) a copy of the once-off shared keycode is made available in machine-readable character format, for example UTF-8, and the copy of the once-off shared keycode is received at the presenting peripheral via input from the presenting interactor or/and accepting interactor or/and accepting appliance; or (b) a copy of the once-off shared keycode is comprised in a QR code, and the copy of the once-off shared keycode is received at the presenting appliance via a camera function comprised in the presenting appliance that is used to capture the quick response code and extract a copy of the once-off shared keycode.

The accepting appliance communication may further contain one or more predetermined auxiliary parameters, and the presenting appliance communication may also further contain said one or more predetermined auxiliary parameters. These auxiliary parameters may optionally also have to be matched as will be described further below before corroboration is successful to initiate and conduct a search for any target records. This further matching condition in the process of corroboration, where mandated over and above the shared keycode, further enhances the method as it introduces additional criteria into the process of seeking to match an accepting appliance communication and presenting appliance communication. The predetermined auxiliary parameter may be a code agreed between the accepting interactor and the presenting interactor, or it may be a value pertinent to the interaction between the presenting interactor and the accepting interactor, such as the value of the intended transaction.

If a validity period is assigned to the once-off shared keycode, said shared keycode maybe unique over the duration of its validity period.

Another aspect of the invention comprises a method to permit a communication of at least one set of controlled credentials connected to the presenter, at a server to a network endpoint, while maintaining the privity prevailing in the set of controlled credentials connected to the presenter wherein the permission comprises an accepting appliance communication containing a shared keycode and a presenter secret keycode, and a presenting appliance communication containing a shared keycode and a presenter identifier, the method comprising: (a) at a/the server receiving the accepting appliance communication; (b) at a/the server receiving the presenting appliance communication; (c) at a/the server seeking to match the once-off shared keycode contained in the accepting appliance communication with the corresponding once-off shared keycode contained in the presenting appliance communication, (d) at a/the server initiating a search for a target record by linking the (presenter) secret keycode contained in the accepting appliance communication and the presenter identifier contained in the presenting appliance communication, wherein both said communications contain the same shared keycode; (e) at a/the server conducting a search for a target record comprising both said (presenter) secret keycode and said presenter identifier; (f) if a target record is identified, at a/the server identifying an entry affiliated with said target record, said entry pertaining to the controlled credentials connected to the presenter; (g) at a/the server permitting a retrieval of said credential set identified by said entry affiliated to the target record, and permitting a release of said credential set to said network endpoint, said endpoint being the permitted recipient of a set of controlled credentials connected to the presenter, and said endpoint being either the accepting appliance or that of a designated third party linked to the accepting appliance.

The target record at said server may also further comprise an alias associated to said entry pertaining to each credential set connected to the presenter, and the presenting appliance communication may further contain a copy of an alias selected from a list of aliases itemized at the presenting appliance, wherein the step of conducting a search for a target record comprising the same presenter identifier and secret keycode also utilizes the copy of the alias contained in the presenting appliance communication to search for a target record comprising the same said alias in addition to the same presenter identifier and secret keycode.

The entry pertaining to the credential set connected to the presenter may be comprised in said target record on said controlling server configured to permit the retrieval and release of the credential set connected to the presenter, and the steps of retrieving the credential set connected to the presenter and releasing the credential set connected to the presenter are performed at said controlling server configured to permit the retrieval and release of the credential set connected to the presenter.

The credential set connected to the presenter may be comprised in separate entries on a different server separately from said controlling server configured to permit the retrieval and release of the credential set connected to the presenter, the separate entry being affiliated with the target record, wherein the steps of retrieving and releasing the credential set are performed at either said controlling server configured to permit the retrieval and release of the credential set connected to the presenter or said different server separate to that controlling server configured to permit the retrieval and release of the credential set connected to the presenter.

A validity period may be assigned to the accepting appliance communication and/or the presenting appliance communication and/or the shared keycode contained in the accepting appliance communication or/and in the presenting appliance communication, wherein the step of seeking to match the shared keycode contained in an accepting appliance communication and the shared keycode contained in the presenting appliance communication further comprises establishing whether the validity period has expired. This ensures that if an accepting appliance communication is not matched to a presenting appliance communication as discussed below within a certain timeframe (the validity period), then such interaction/notification/communication lapses and thereby becomes void rendering further processes redundant. Where any validity period lapses and becomes void rendering further processes redundant, the data pertaining to the communication can be purged, freeing up resources for the processing of further communications. Where any communications are generated/transmitted/received and contain shared keycodes bearing a validity period, the validity period can ensure that shorter, less complex shared keycodes can be used because shared keycode re-use is thereby feasible. Upon expiry of the validity period of a shared keycode, the same shared keycode may be re-used in a subsequent iteration of the method.

If a validity period is assigned to the shared keycode, said shared keycode may be unique over the duration of its validity period.

The accepting appliance communication may further contain one or more predetermined auxiliary parameters, and the presenting appliance communication may also further contain said one or more predetermined auxiliary parameters, wherein the step of seeking to match shared keycodes further comprises the step of seeking to corroborate the predetermined auxiliary parameter contained in the accepting appliance communication and the corresponding predetermined auxiliary parameter contained the presenting appliance communication.

A further aspect of the invention comprises a method to permit a communication of a set of controlled credentials connected to a presenter, at a server to a network endpoint, while maintaining the privity prevailing in the credentials connected to the presenter, a permission made/granted in accordance with any of the aspects of the invention described above, the method comprising: (a) at a/the server receiving the accepting appliance communication; (b) at a/the server receiving the presenting appliance communication; (c) at the server seeking to match the once-off shared keycode contained in the accepting appliance communication and the corresponding once-off shared keycode contained in the presenting interactor communication, (and thereby matching said accepting appliance communication with said presenting appliance communication); (d) at a/the server, initiating a search for a target record by linking the secret keycode contained in the accepting appliance communication and the presenter identifier contained in the presenting appliance communication; (e) at a/the server conducting a search for a target record comprising both said secret keycode and said presenter identifier; (f) if a target record is identified, identifying an entry pertaining to a credential set connected to the presenter and associated; (g) if a credential set connected to the presenter is identified, at a/the server permitting a retrieval of the credential set connected to the presenter, and permitting a release of said credential set connected to the presenter to said network endpoint, said endpoint being the permitted recipient of the credential set connected to the presenter, and said endpoint being either the accepting appliance or that of a designated third party linked to the accepting appliance.

If said credential sets connected to the presenter are comprised in said records on said controlling server configured to permit the retrieval and release of the controlled credentials, the steps of retrieving the connected presenter credential set and communicating the connected presenter credential set may be performed at said controlling server configured to permit the retrieval and release of the controlled credentials.

If said credential sets connected to the presenter are comprised in separate entries on a different server that is separate from said controlling server configured to permit the retrieval and release of the controlled credentials, (the step of identifying an entry pertaining to a connected presenter credential set may be performed at said different server separate to said controlling server configured to permit the retrieval and release of the controlled credentials), the steps of retrieving the connected credential set and releasing the connected credential set may be performed at either the controlling server configured to permit the retrieval and release of the credential set connected to the presenter or the different server separate to that controlling server configured to permit the retrieval and release of the credential set connected to the presenter.

The step of seeking to match the shared keycodes may further comprise establishing whether the validity period has expired.

The step of seeking to match the shared keycodes may further comprise seeking to match the predetermined auxiliary parameter contained in the accepting appliance communication with the corresponding predetermined auxiliary parameter contained in the presenting appliance communication.

If a validity period is assigned to the once-off shared keycode, said shared keycode may be unique over the duration of its validity period.

In another aspect of the invention, a method comprising (a) an accepting appliance making a once-off shared keycode available to the presenting interactor; (b) receiving a presenter secret keycode belonging to the presenting interactor at the accepting appliance wherein said presenter secret keycode is input at the terminal by the presenting interactor; (c) communicating an accepting appliance communication from the accepting appliance to the server, the accepting appliance communication comprising the once-off shared keycode and the presenter secret keycode; (d) the presenting appliance receiving the once off shared keycode; (e) the presenter appliance retrieving a presenter identifier belonging to the presenting interactor from a storage location on the presenting peripheral or appliance; and (f) the presenting peripheral communicating a presenting appliance communication to the controlling server, the presenting appliance communication comprising the once-off shared keycode, and the presenter identifier.

The target record at said server may also further comprise an alias associated with said entry pertaining to each credential set connected to the presenter, and the presenting appliance communication may further contain a copy of an alias selected from a list of aliases itemized at the presenting appliance, and wherein the step of conducting a search for a target record that comprises the same presenter identifier and secret keycode also utilizes the alias contained in the presenting appliance communication to search for a target record comprising the same said alias in addition to the same presenter identifier and secret keycode.

The credential set may be comprised as an entry in said target record on said controlling server configured to permit the retrieval and release of the controlled credentials, and the steps of retrieving the credential set and releasing the credential set are performed at said controlling server configured to permit the retrieval and release of the controlled credentials.

The credential set may be comprised as an entry on a different server separate to the said controlling server configured to permit the retrieval and release of the controlled credentials, the separate entry being affiliated with the target record, and wherein the steps of retrieving and releasing the credential set may be performed at either said controlling server configured to permit the retrieval and release of the controlled credentials or the different server separate to that controlling server configured to permit the retrieval and release of the controlled credentials.

A further aspect of the invention comprises a presenting appliance configured to perform one or more of the presenting appliance steps described above.

Another aspect of the invention comprises an accepting appliance configured to perform one or more of the accepting appliance steps described above.

An additional aspect of the invention comprises a server configured to perform one or more of said server steps described above.

A further aspect of the invention comprises a system comprising two or more of the presenting appliances, two or more of the accepting appliances, and said controlling server configured to perform one or more of the embodiments as described above.

An additional aspect of the invention comprises a computer readable storage medium carrying a computer program stored thereon, said program comprising computer executable instructions adapted to perform one or more of the method steps described above when executed by one or more processing modules.

BRIEF DESCRIPTION OF THE DRAWINGS

FIGS. 7 and 8 are a representation of entries pertaining to the controlled credentials connected to the presenter in accordance with embodiments of the invention.

FIGS. 7A to 7E represent various embodiments of storing records on the controlling server or credential server 101 in accordance with embodiments of the invention.

DETAILED DESCRIPTION

Figure 1:
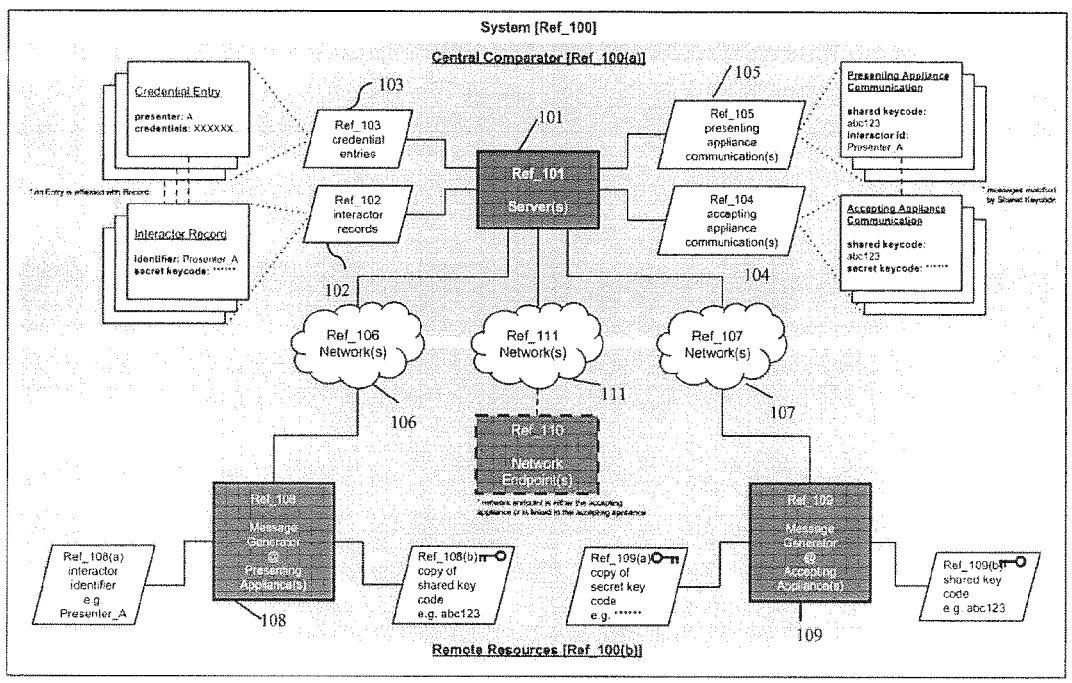
FIGS. 1, 1A and 1B are diagrams illustrating the central system to preserve privity in accordance with different embodiments of the invention.
Figure 1A:
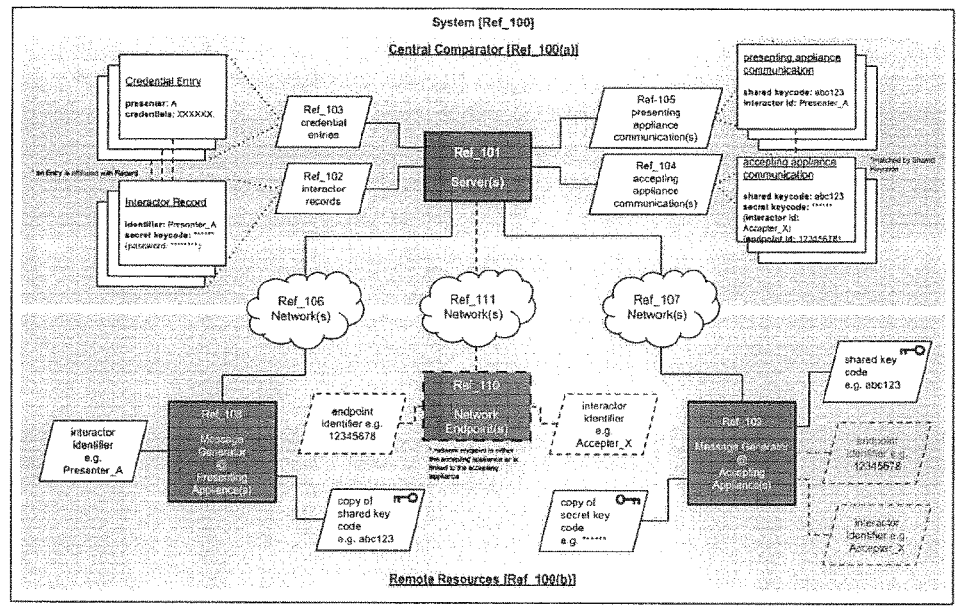
Figure 1B:
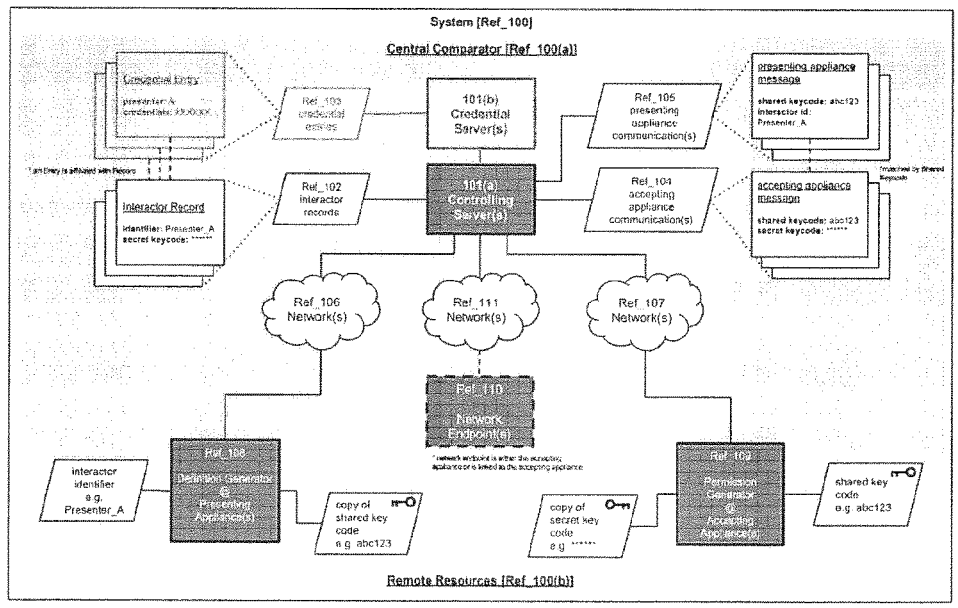

FIG. 1 is a diagram illustrating the central system to preserve privity in a manner that also facilitates permitted release of a stored credential set to a recipient approved by the participant to whom the credential set pertains. The system 100 is secure in that it protects the credential sets from unauthorized access by unauthorized would-be recipients of the credential sets, and also prevents the credential sets from use by those who would fraudulently present a credential set as being their own. Parties enrolled with the system are designated as "presenters" and "accepters" in accordance with their role in the method of the invention and their manner of interacting with the system of the invention. In the course of an interaction between a presenter and an accepter, it may be necessary for the presenter to release a credential set with which they are associated. Presenters and accepters actively engaged in such an interaction are respectively designated as "presenting interactors" and "accepting interactors". It will be appreciated that in many embodiments of the invention, presenters are each associated with credential sets that are unique to them such that the presenters are related to the credential sets in a "one-to-one" fashion. However, the invention also envisages scenarios where there is a "many-to-one" relationship between presenters and credential sets, where many presenters are associated with a single credential set, and it is still desirable to maintain said credential set in a state of privity.

In accordance with an embodiment of the invention, the system and method of the invention is used by such a presenting interactor to release a credential set associated with said presenting interactor to one or more designated recipients in a manner that maintains the privity of the credential set. In accordance with other embodiments of the invention, the system and method of the invention may be used by an accepting interactor to release a credential set associated with the accepting interactor to one or more designated recipients while preserving said state of privity. Other embodiments of the invention envisage concurrent disclosure of both presenter and accepter credential sets associated respectively with presenting interactor and accepting interactor. Both the presenter and the accepter cooperate to facilitate the release of such credential sets from the system. The designated recipient may be the accepting interactor, the presenting interactor or may be a trusted third party.

The system 100 comprises at least one server 101, the server comprising a collection of presenter records 102. Each presenter record pertains to a given participant that has enrolled as a presenter with said server 101, and each said record comprises the one or more credential sets pertaining to that presenter. More particularly, each presenter record comprises a presenter identifier, a presenter secret keycode, at least one set of credentials associated with said presenter, and at least one alias, wherein each set of credentials is connected respectively with one alias whereby each alias within a presenter record is distinguishable from the remaining aliases for that presenter record. The presenter identifier is a unique string that is used to identify a given presenter record for the presenter record collection. The presenter secret keycode is a string known only to the presenter. When a presenter interacts with the system with a view to releasing a presenter's credential set to a designated recipient (such a presenter is referred to as a "presenting interactor"), they provide their presenter identifier, and their presenter secret keycode can then be utilized to authenticate the presenting interactor before any credential sets are released. In addition to the presenter identifier and the presenter secret keycode, each presenter record comprises at least one set of credentials. As previously described, each credential set comprises a set of personal data that is particular to an individual and necessary for a given interaction. Each credential set is also associated with a distinguishable alias. By way of illustration, an individual by the name of "John Brown" may have a first set of credentials pertaining to a driving license, and a second set of credentials pertaining to a store loyalty card. The first set of credentials may comprise the name "John Brown", a date of birth, a driving license number, and an expiry date. The second set of credentials may comprise the name "John Brown", an address, and a loyalty club membership number. The first set of credentials may be associated with the alias "driving license", whereas the second set of credentials may be associated with the alias "loyalty card 1". It will be appreciated that in embodiments of the invention where it is envisaged that each presenter record will comprise only one credential set, it may not be necessary for the presenter records to further comprise an alias connected to each credential set. Rather, in such instances, identification of the record pertaining to the interacting presenter will automatically also indicates the credential set to be released.

In addition, in some embodiments of the invention the server 101 also comprises a collection of separate accepter records. Each accepter record pertains to an individual or organization that has enrolled as accepter with the server, and comprises one or more credential sets associated with that accepter. Each accepter record further comprises an accepter identifier, and optionally an accepter secret keycode. The accepter identifier is a unique string that is used to identify a given accepter record within the accepter record collection. The accepter secret keycode (if applicable) is a string known only to the accepter. When an accepter interacts with the system with a view to facilitating the release of a presenter credential set associated with the presenting interactor with a designated recipient (such an accepter is referred to as an "accepting interactor") the accepter identifier of the accepting interactor is provided, and the accepting interactor's accepter secret keycode (if utilized) can then be employed to authenticate the accepting interactor before any credential sets are disclosed.

It will be appreciated that while in this described embodiment of the invention, the presenter records and accepter records are distinct and are typically maintained as separate record collections, in other embodiments of the invention, the server 101 may comprise a single record collection comprising both presenter and accepter records. Furthermore, it will also be appreciated that while in one embodiment, an accepter's and/or presenter's credential sets are stored on a server, multiple servers are also envisaged, wherein each server is tasked with the storage of records comprising one or more credential set types.

It is additionally envisaged that in some embodiments of the invention, the server 101 will solely comprise presenter records, and will comprise no accepter records. Preferably, in such embodiments, the server 101 and potential accepting interactors will be capable of communicating with one another via their existing software systems. This embodiment of the invention is advantageous because pre-enrolment of accepters is not required, and this removes an obstacle to uptake of the claimed system and method amongst potential accepting interactors. This therefore improves ease of use of the system and method.

The server 101 is communicable with one or more appliances 108 over a communication channel. It will be appreciated that the communication channel 106 may comprise the Internet, a proprietary network, or a combination of the two. Appliance 108 may be disparately located, and may connect to the communication channel 106 by way of one or more of a variety of technologies, such as PSTN, Ethernet, DSL, ISDN, Wi-Fi, WiMax, 2G, 3G, LTE, 4G, etc. The appliances 108 may be any of a variety of devices including desktop personal computers, laptops, tablet personal computers, personal digital assistants, mobile phones, smartphones etc. The appliance 108 may alternatively comprise bespoke computing systems as used in a variety of industries including banking, finance, aviation, travel, homeland security, border control, energy, transport, retail and/or telecommunications. Accordingly, the appliances may comprise devices configured to act as Point of Sale devices. In the context of the invention, these appliances will be referred to as "accepting appliances".

The server 101 is also communicable over a communication channel 107 with one or more appliances 109. Such appliances may comprise, for example, wireless devices communicable with the server 101 via a wireless base station or router. The wireless devices may comprise any form of wireless device including laptops, tablet personal computers, personal digital assistants, mobile phones, smartphones etc. Such peripheral devices may further comprise devices communicable over communication channel 104 via a wired connection, and thus may, for example, include desktop computers as well as industry-specific bespoke computing systems mentioned above, including but not limited to Point of Sale systems. In the context of the invention, these peripheral devices will be referred to as "presenting peripherals". In an embodiment, the presenting peripheral may also be password-protected or may require additional permission from the presenter to initiate communication. The presenting peripherals may be disparately located, and may communicate with the server 101 over communication channel 107 via a variety of means such as PSTN, Ethernet, DSL and ISDN. Presenting peripherals comprising wireless devices may communicate with router 103 by way of one or more of a variety of wireless communications technologies, such as Wi-Fi, WiMax, 2G, 3G, LTE, 4G, etc. The communication channel 107 may comprise the Internet, a proprietary network, or a combination of the two. The presenting peripherals are configured with an application that facilitates communication with the server 101. As the connection between the accepting appliances 109 and the server 101 comprise a first communications channel 106 and the connection between the presenting appliances comprise a second communications channel 107, the system 100 may be regarded as being "multichannel" in composition. This ensures a more secure mechanism by which credential sets and other sensitive data may be stored and released to network endpoint 110 while remaining in a state of privity. The network endpoint 110 in some embodiments may be either a separate appliance or the accepting appliance itself depending on designated destination in the accepting appliance communication.

While in this embodiment, it has been described that the credential sets and connected aliases are comprised in the presenter and/or accepter records on the server, in other embodiments of the invention, it is anticipated that said credential sets and connected aliases may be affiliated with said presenter and/or accepter records in alternative ways. For example, the credential sets and affiliated aliases may be comprised in one or more record sets separate to the record set(s) on the server that comprise the records comprising the identifiers and secret keys. These separate record sets may be housed on one or more different servers. In some embodiments of the invention, the different servers housing the credential sets are administered by the controllers responsible for the issuance of the instruments comprising said credential sets.

Figure 2:
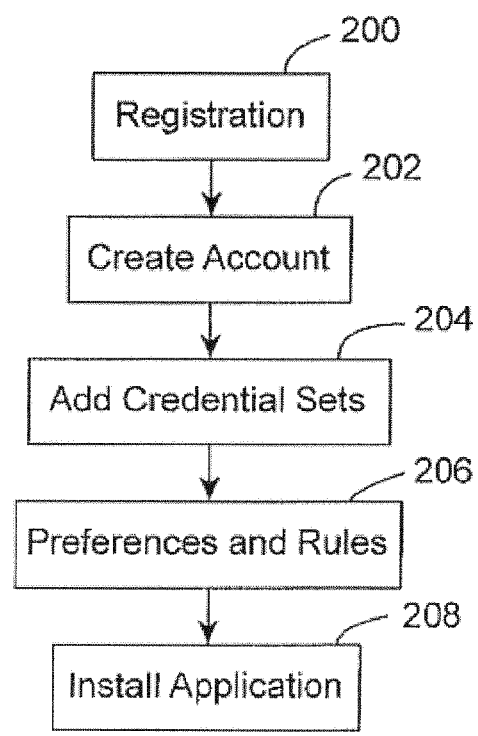
FIG. 2 is a flowchart illustrating how a new potential applicant enrolls with the server 101 as a presenter in accordance with an embodiment of the invention.

FIG. 2 is a flowchart illustrating how a new potential applicant enrolls with the server 101 as a presenter in accordance with an embodiment of the invention. At step 200, a web page hosted by the server 101 is accessed by the new presenter applicant, preferably using their presenting peripheral 105, 107, and 109. The web page is configured such that at this step, the new presenter applicant provides general enrolment details such as name, address, email address, country of residence, etc. and submits these to the server 101. It will be appreciated that while in some embodiments, this invention, the enrolment details are provided directly to the server 101, in other embodiments, the enrolment details may be pre-provided indirectly for pre-processing prior to entry of the details in the server 101. The web page may be accessed over a connection for the duration of the procedure, or else secure connections may merely be used only where sensitive information (such as a credential set or additional data such as a presenter's secret keycode) is being transmitted. It will also be appreciated that alternative means of enrolment are possible such as by way of submitting a completed form by mail, fax, etc.

Then, at step 202, a new account is created on the server 101 for the presenter applicant. This is done by generating a new presenter record in the collection of presenter records. Either at step 200 or at step 202, the new presenter applicant is prompted to select and enter a new presenter secret keycode, which is then added to the new presenter applicant's presenter record. In alternative embodiments of the invention, the new presenter record may be automatically provided with a temporary presenter secret keycode, which may subsequently be updated to a custom presenter secret keycode by the presenter applicant thereafter. Such a temporary secret keycode may be provided by way of the web page, or preferably by way of a second communication channel that may comprise any form of communication, including email, SMS messaging, telephone call or post. In some embodiments of the invention there is additionally scope for providing a replacement secret keycode for example in the event the original secret keycode is forgotten or compromised. Such replacement secret keys may similarly be provided via any form of communication including via a website, email, SMS, telephone call or post.

At step 204, the new presenter applicant is prompted to add credential sets to a new presenter applicant's newly created account. As previously described, these credential sets may comprise a variety of personal data, and may pertain to credential set-bearing instruments issued by a variety of different governmental or commercial oversight bodies. Each credential set will be connected to an alias unique to its parent presenter record (i.e. each alias is "locally unique"). In one embodiment, the new presenter applicant may be prompted at step 206 to provide a locally unique alias for each credential set provided. In another embodiment, a default alias may be provided for each credential set. In one embodiment, the aliases may be subsequently editable by the presenter. In some embodiments of the invention, the presenter record may be editable after enrolment to the extent that existing credential sets and connected aliases may be edited and/or that new credential sets and connected aliases may be added. In some embodiments of the invention, the presenting interactor record may be editable after enrolment to the extent that existing credential sets and connected aliases may be edited or deleted and that new credential sets and connected aliases may be added.

At step 206, the new presenter applicant is given the opportunity to set specific preferences associated with the processing and usage of credential sets associated with particular governmental or commercial oversight bodies and the interaction types to which they pertain. By way of example, with respect to a credential set pertaining to an airline loyalty membership, the presenter may be given the option to set additional preferences in accordance with their membership preferences, such as preferred airline meal, seat reference, or local airport. By way of a further example, with respect to a credential set pertaining to a credit card, the presenter may be given the option to enable functionalities such as card preference usage, direct currency conversion, value added tax refunding for travelers or splitting payment over multiple cards.

At step 208, the new presenter applicant is then prompted to install a bespoke application on their presenting peripheral. The bespoke application is configured to facilitate communication with the server as required during the process of permitting that the server release a credential set and the process of authenticating such a transmitted permission as will be described in greater detail below. During the course of installing the bespoke application, the application is associated with a unique presenter identifier that is retained on the presenting peripheral. In a preferred embodiment, the presenter identifier is assigned by the server, and is embedded in the application before, during or after the application is installed on the presenting peripheral. Alternatively, the presenter identifier may be derived from a sequence of characters native to the presenting peripheral, for example an IMEI number or serial number. This sequence of characters may be modified to arrive at a unique presenter identifier. In addition to retention on the presenting peripheral, the presenter identifier is also added to the presenter record in the presenter record collection on the server 101. During the course of installing the bespoke application, the application is also provided with the aliases connected to the credential sets stored in step 204 for a given presenter. Accordingly, when the application is used in an interaction by the new presenter, it has at its disposal both a presenter identifier and the aliases connected to the new presenter's credential sets such that the presenter identifier and an alias may be communicated to the server 101 as appropriate.

Figure 3:
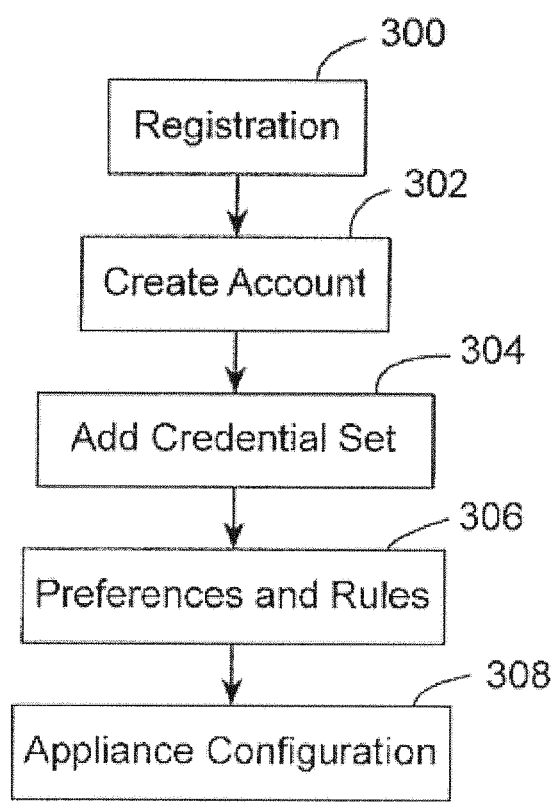
FIG. 3 is a flowchart similar to that of FIG. 2 depicting the steps via which a party may enroll as an accepter with the server 101 in accordance with an embodiment of the invention.

In a preferred embodiment, a generic version of the application may be initially installed on a new presenter applicant's presenting peripheral. Subsequent to the process depicted in steps 200-208, the new presenter applicant may be prompted to authenticate their account by replying to an email, and/or by confirming their presenter's secret keycode in reply to a prompt from the server. Subsequent to this authentication, the generic version of the application on the new presenter applicant's presenting peripheral may be customized with the new presenter applicant's presenter identifier, the aliases connected to the new presenter applicant's credential sets, and the new presenter applicant's preferences as configured in step 206. This data may be stored in an encrypted format on the new presenter applicant's presenting peripheral. FIG. 3 is a flowchart similar to that of FIG. 2 depicting the steps via which a party may enroll as an accepter with the server '101 in accordance with an embodiment of the invention. As previously indicated, the invention envisages embodiments where the accepter must actively enroll with the server, as well as embodiments where it is not necessary for the accepter to enroll with the server. Furthermore, in other embodiments of the invention, enrolment of the accepter may be done "passively" as will be described in greater detail below. At step 300, a web page hosted by the server 101 is accessed by the party (hereafter referred to as a "new accepter applicant"), preferably using the accepting appliance 111. In a fashion analogous to step 200 of FIG. 2, the web page is configured such that at this step, the new accepter applicant provides general enrolment details such as the name of the individual or organization, address, email address, etc. and submits these to the server 101. The web page may be accessed over a secure connection for the duration of the procedure, or else secure connections may merely be used only where sensitive information (such as an accepter's secret keycode or an acceptor's credential set) is being transmitted. It will be further appreciated that enrolment of new accepter applicant may take place by way of other means such as by mail or fax; Alternatively, if the accepter operates an accepting appliance that is remote controlled by a linked third party (such as, for example, Terminal Management Systems used by Acquirers to manage card payment Point of Sale devices, enrolment of an accepter may be initiated by the linked third party. In such scenarios, it may not be necessary for the accepter to provide any information themselves.

At step 302, a new account is created on the server 101 by generating a new accepter applicant record in the collection of accepter records.

In order to arrange for disclosure of a presenter credential set, permission must be given as described further below. In one embodiment of the invention, any permission emanating from an acceptor for the release of a presenter credential set will require that the accepter be identified, and hence, any permission for the release of a presenter credential set may require the initial provision of an accepter credential set. Accordingly, it is envisaged that just as for the presenter records, a separate accepter credential set is required in an accepter record for each interaction type that an accepter wishes to engage in. Interaction types may be defined broadly—for example, the release of a driving license instrument and the release of a payment card instrument may be regarded as different interaction types. Alternatively, interaction types may be defined narrowly—for example the release of different payment card instruments (e.g. Mastercard, Visa Debit) may be regarded as different interaction types. Accordingly, while in some embodiments, for example, an accepter credential set may apply generally to all payment cards, in other embodiments, an accepter may have a different credential set for each different payment card type handled by the accepter.

At step 306, the new accepter applicant is given the opportunity to set specific preferences associated with the processing and usage of credential sets associated with particular interaction types. By way of example, with respect to a credential set pertaining to a credit card, the new accepter applicant may be given the option to indicate whether they wish to provide downstream functionalities associated with the credential set once the accepter credential set has been released, such as direct currency conversion, value added tax refunding for travelers or splitting payment over multiple cards.

At step 308, the accepting appliance is then configured such that it may communicate with the server. This may be done in a variety of ways. In embodiments of the invention where the accepting appliance is remote controlled by a third party, the third party may initiate an automatic reconfiguration of the accepting appliance if required. In other embodiments of the invention, the new accepter applicant may initiate reconfiguration via installation of a bespoke application in a manner similar to that described in FIG. 2.

Figure 4:
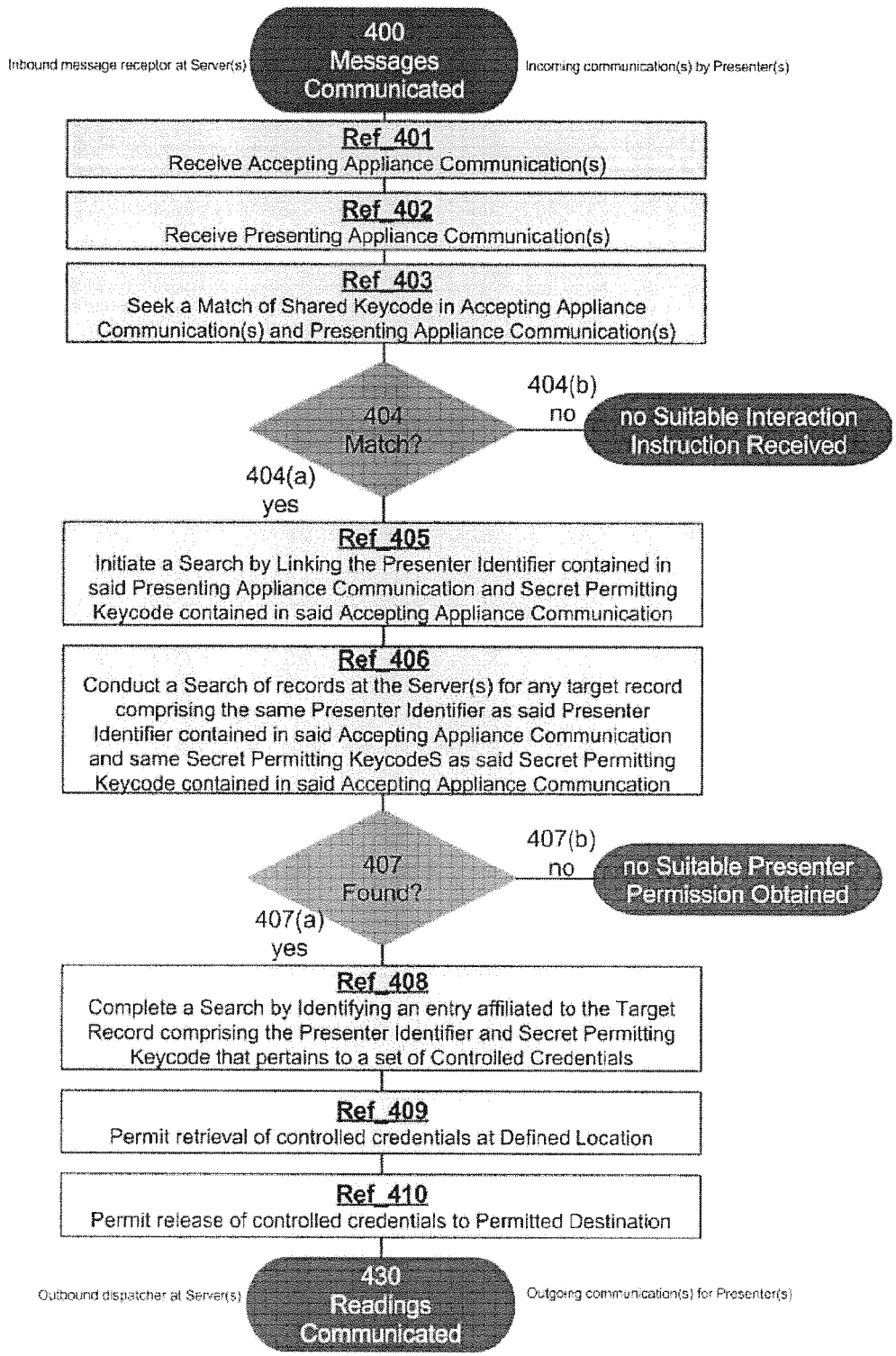
FIG. 4 is a flowchart illustrating the method of permitting the release of at least one set of controlled credentials connected to a presenter while maintaining privity prevailing in said credentials in accordance with an embodiment of the invention.

FIG. 4 is a flowchart illustrating the method of permitting the release of at least one set of controlled credentials connected to a presenter while maintaining privity prevailing in said credentials in accordance with an embodiment of the invention. The controlling server receives an accepting appliance communication containing a secret keycode and a once-off shared keycode and a presenting appliance communication containing a presenter identifier and a once-off shared keycode. At step 403, the communication messages are compared. An unsuccessful match terminates the method and the interaction instruction is not completed. If the shared keycodes match, at step 404 a search for a target record on the server is initiated by linking the secret keycode and presenter identifier. A search for any target record comprising the same presenter identifier and secret keycode as contained in the accepting appliance communication and presenting appliance communication. If a target record is found, the credential set pertaining at the storage location present in the record is retrieved and permitted to be released to a designated destination that is the network endpoint.

Figure 5A:
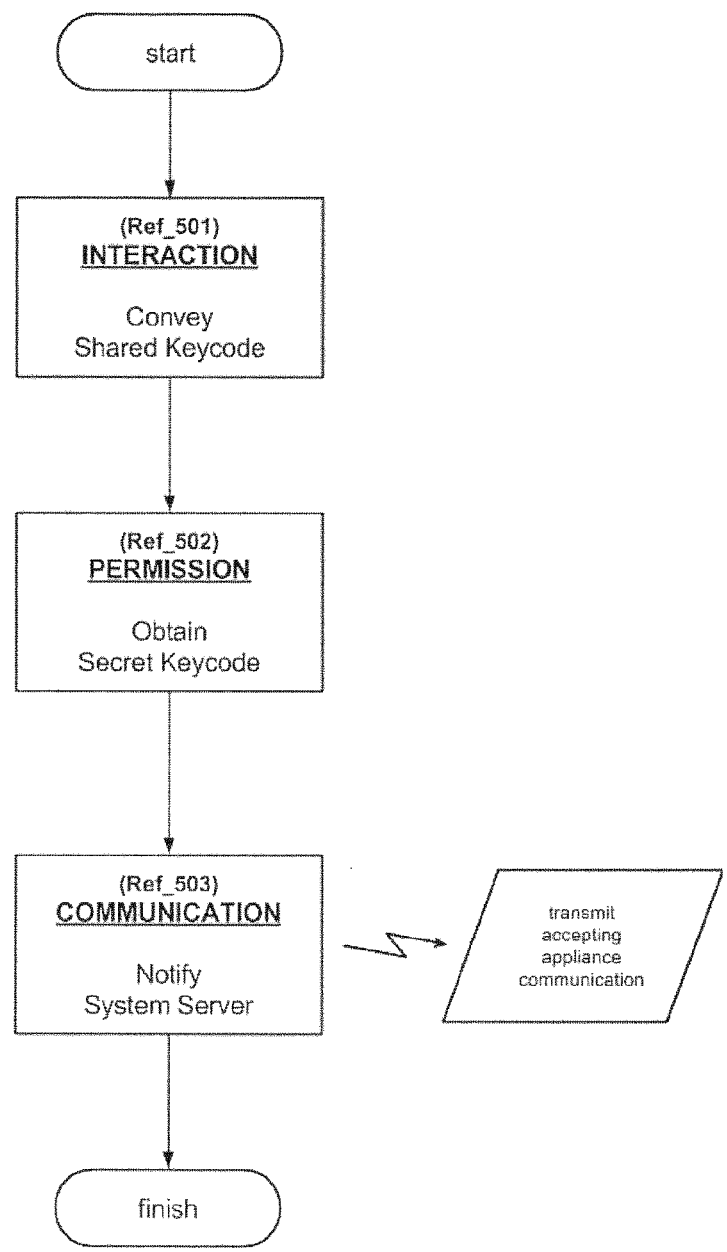
FIGS. 5A and 5B disclose the process performed at accepting appliance in accordance with embodiments of the invention.
Figure 5B:
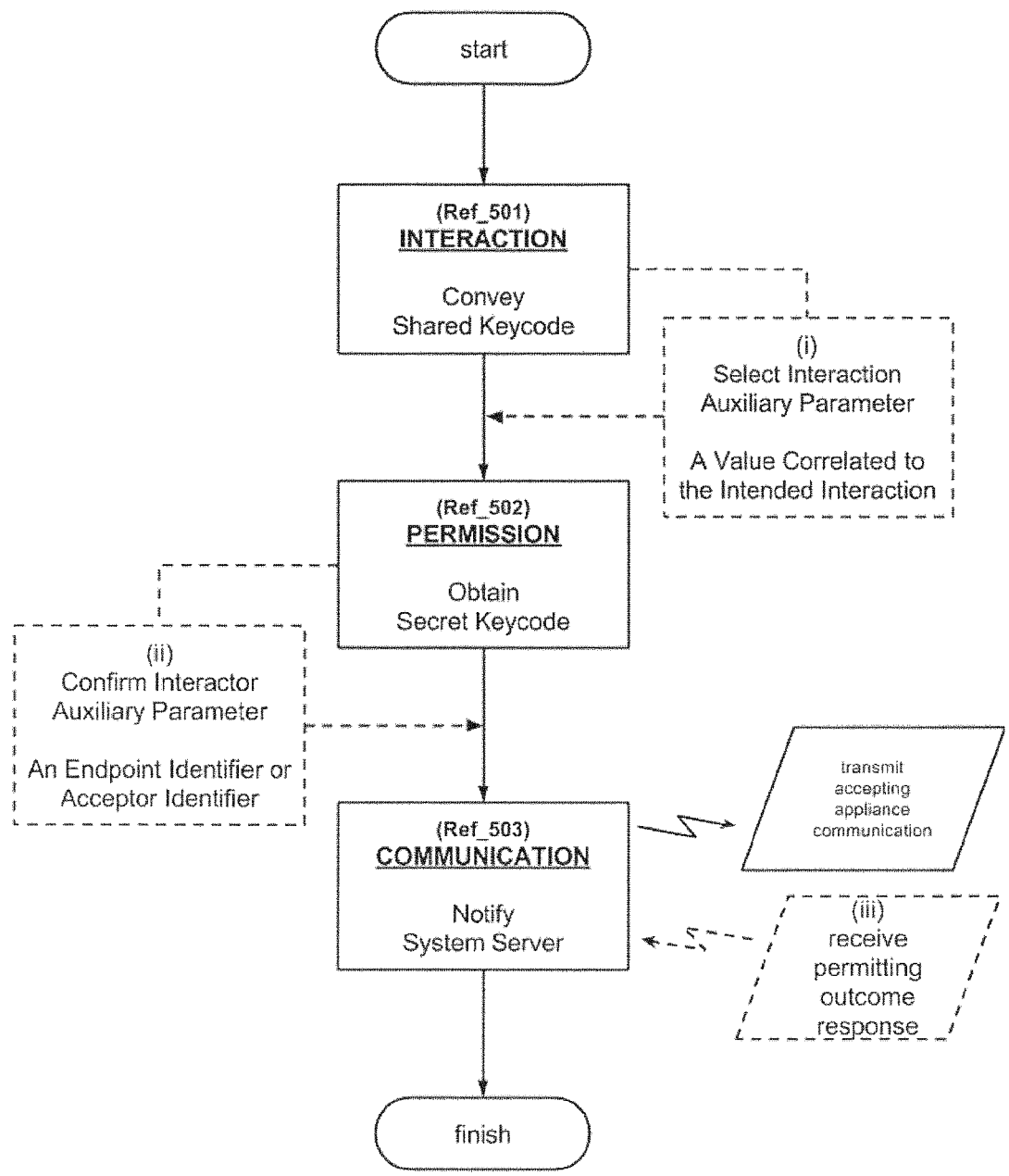

FIGS. 5A and 5B disclose the process performed at accepting appliance. A once-off shared keycode is generated by the accepting appliance and conveyed to the presenting appliance. The accepting appliance further receives the presenter secret keycode and generates a communication to be sent to the controlling server as depicted by 101 in FIG. 1. The said communication comprises of the presenter secret keycode and the once-off shared keycode.

Figure 6A:
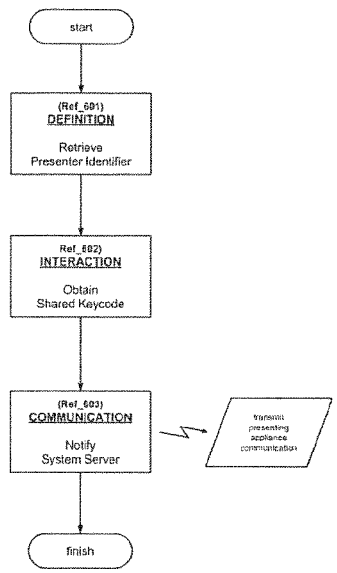
FIGS. 6A and 6B disclose the process performed at the presenting appliance in accordance with embodiments of the invention.
Figure 6B:
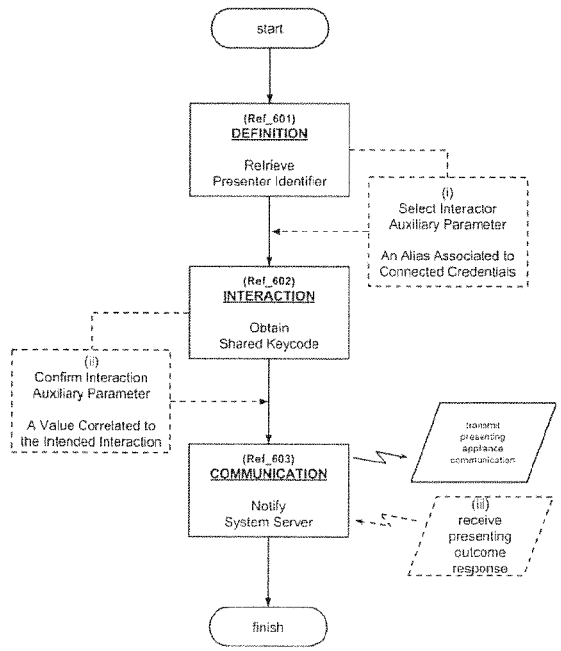
Figure 7:
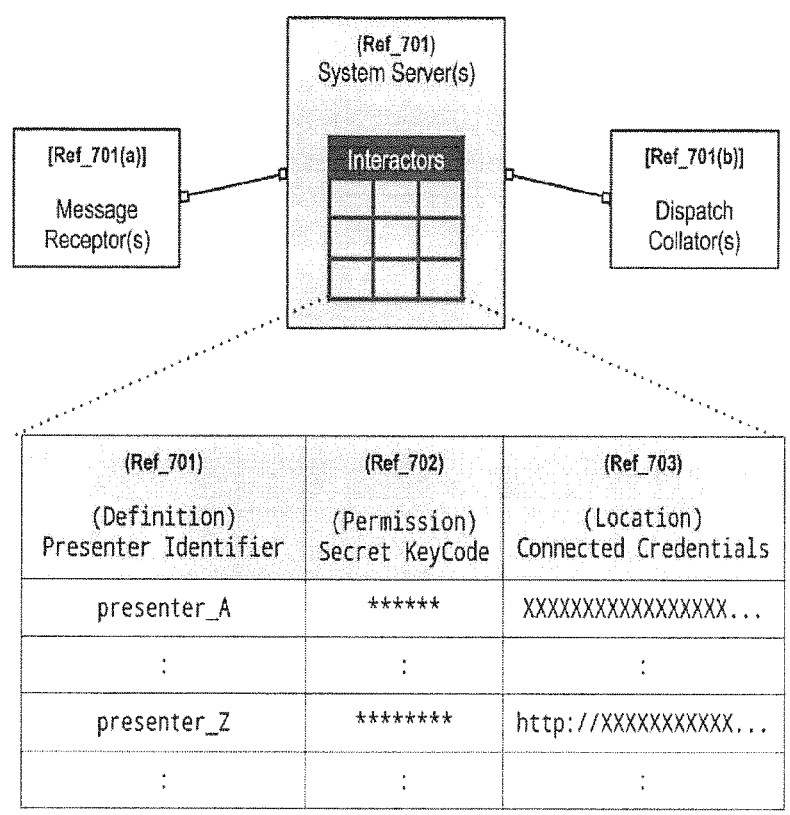
Figure 7C:
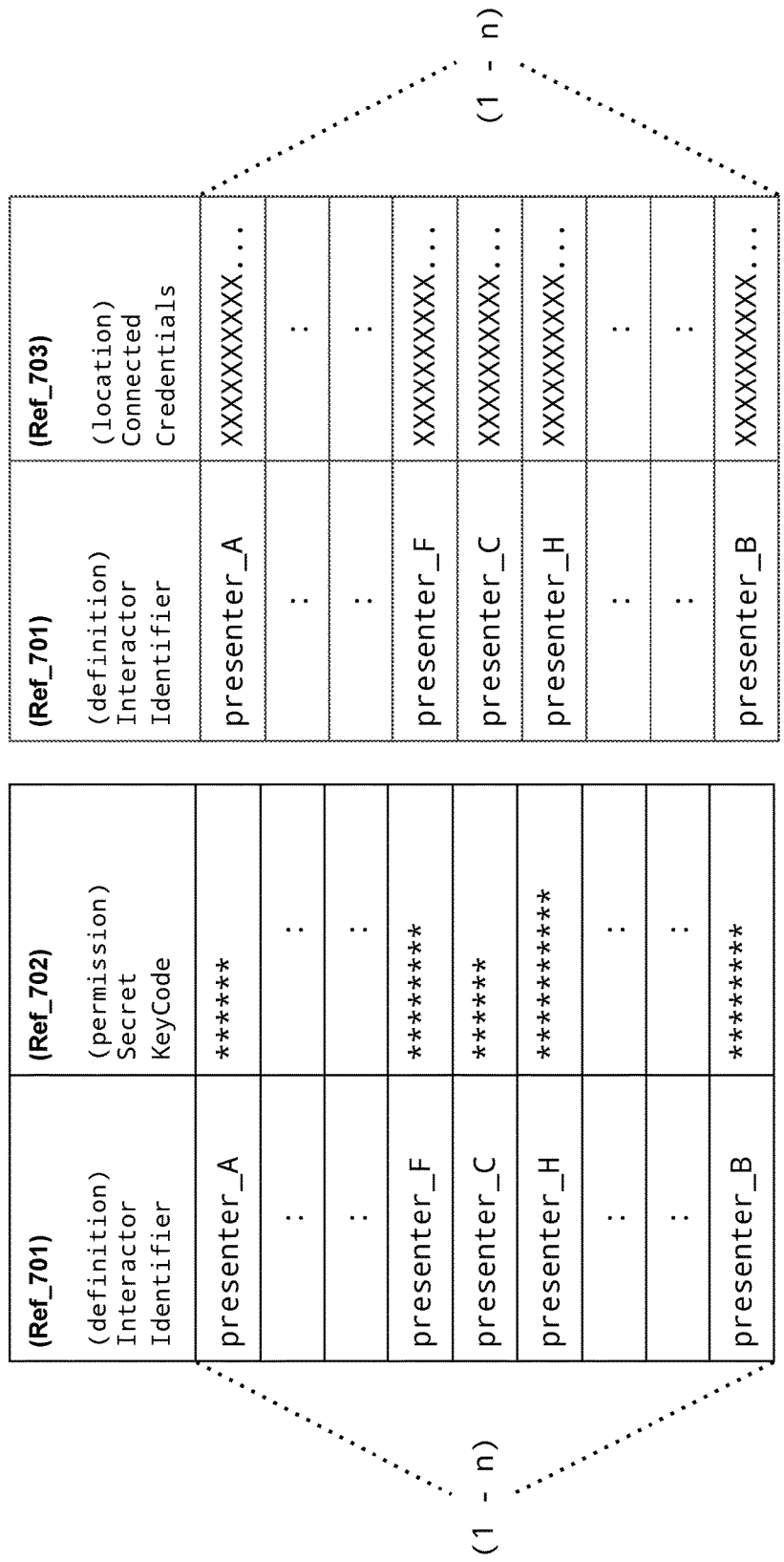
Figure 7D:
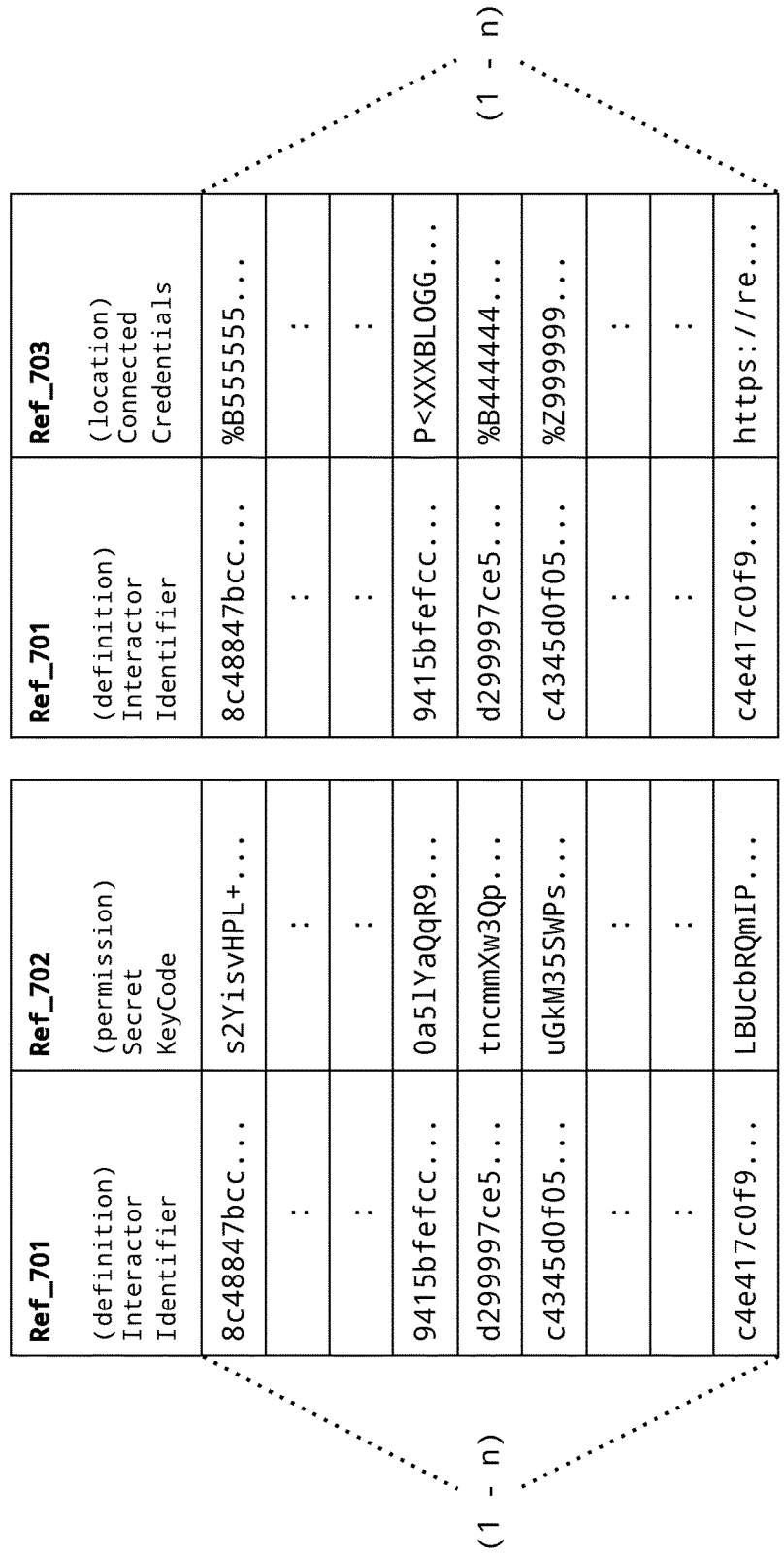

FIGS. 6A and 6B disclose the process performed at the presenting appliance. The presenter identifier is retrieved from memory. On receiving the once-off shared keycode from the accepting appliance, a communication comprising of the presenter identifier and the once-off shared keycode is transmitted to the controlling server 101. FIG. 7 and FIG. 8 are a representation of entries pertaining to the controlled credentials connected to the presenter. Each of the entries is associated with a presenter identifier and a secret keycode. FIGS. 7A to 7E represent various embodiments of storing records on the controlling server or credential server 101. In some embodiments, records of presenting interactors may be masked and located using look-up lists as is described in FIGS. 7A and 7C. There may be another embodiment wherein each presenter interactor record is associated with an alias.

Figure 9A:
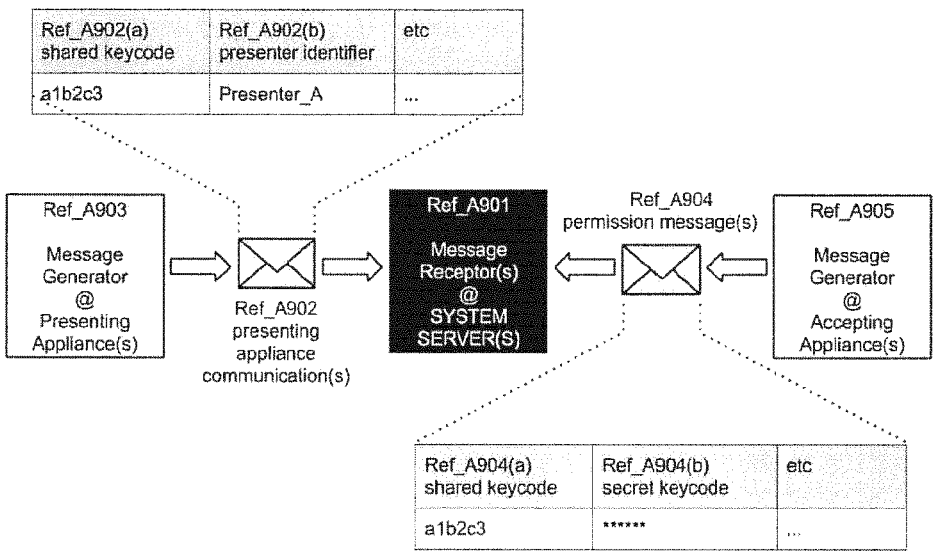
FIG. 9A and 9B disclose graphical representations pertaining to the process of communicating messages at the controlling server from the presenting and accepting interactors and the process of dispatching controlled credentials to permitted destinations in accordance with embodiments of the invention.
Figure 9B:
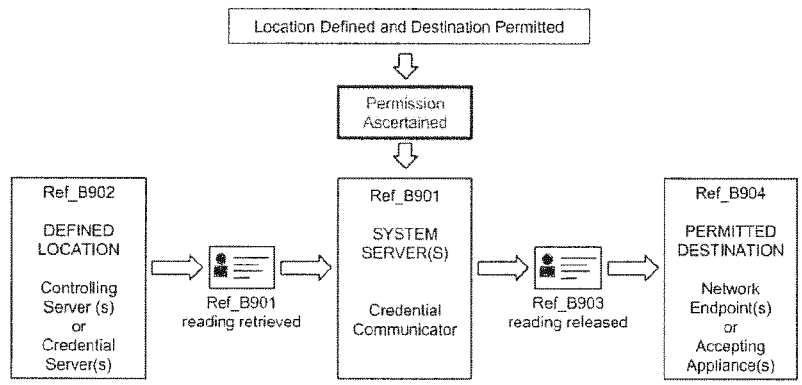
Figure 10:
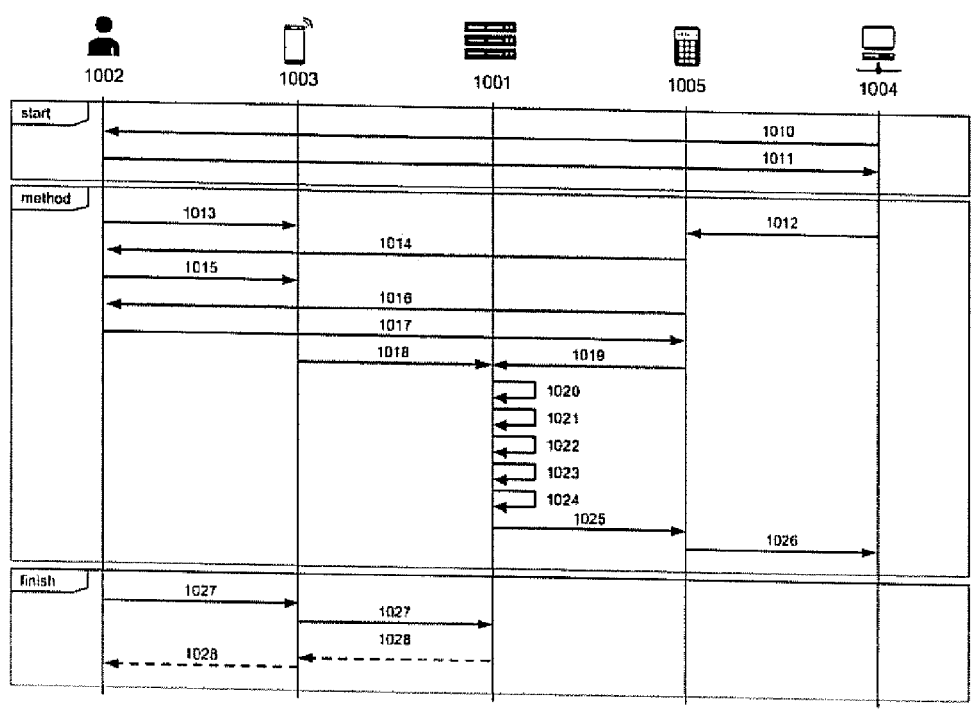
FIG. 10 is a sequence diagram illustrating the process by which permission may be given in accordance with an embodiment of the invention

FIGS. 9A and 9B disclose graphical representations pertaining to the process of communicating messages at the controlling server from the presenting and accepting interactors and the process of dispatching controlled credentials to permitted destinations. FIG. 10 is a sequence diagram illustrating the process by which permission may be given in accordance with an embodiment of the invention involving a server 1001, presenting interactor 1002, presenting appliance 1003, network endpoint 1004, and accepting appliance 1005, to retrieve a set of credentials in storage at a location identified by the presenting interactor 1002 and release a set of credentials to a facility of a recipient permitted by the presenting interactor 1002. It will be appreciated that giving permission to retrieve and release a presenter credential set may also be accompanied with request for retrieving an accepter credential set simultaneously, wherein the accepting appliance 1005 and the presenting appliance 1003 still submit the their respective communications to the Server 1001. It will further be appreciated that in some embodiments of the invention, the permission to release the credential set will specifically be a permission to release a presenter credential set (associated with a presenting interactor 1002) to the network endpoint 1004 or to an accepting appliance 1005. However, in other embodiments of the invention the permission will be to share the accepter or presenter credential set to that of a trusted third party linked to the network endpoint 1004 or the accepting appliance 1005. For example where permission is submitted to share a presenter credential set pertaining to a payment card instrument; it may be that it is intended for the payment card credential set to be sent to a trusted third party transaction processor.

In FIG. 10, a presenting interactor 1002 possessing a presenting appliance 1003 configured to generate and transmit a presenting appliance communication to the server 1001, identifies a facility operating at an accepting interactor that comprises a network endpoint 1004 or/and accepting appliance 1005 (wherein the network endpoint 1004 is an accepting appliance 1005, or wherein the network endpoint 1004 is linked to an accepting appliance 1005), and whereby the accepting appliance is configured to generate and transmit an accepting appliance communication to the server 1001. The presenting interactor 1002 may decide to interact at such facility with a view to permitting a reading of a credential set connected to the presenting interactor 1002 to be released to the network endpoint 1004 or the accepting appliance 1005. The accepting interactor may also decide to interact at such facility with a view to requesting a reading of a credential set connected to the accepting interactor to be returned to the network endpoint 1004 or accepting appliance 1005 when receiving the credential set connected to the presenting interactor 1002 at the network endpoint 1004 or the accepting appliance 1005. More specifically, a state of privity prevailing in the credentials connected to the presenting interactor 1002 is preserved in the preferred embodiment of the present invention, whereby a reading of the set of credentials connected to the presenting interactor 1002 is not visible to or accessible by the accepting interactor nor communicated to or by presenting appliance 1003, but only communicated confidentially to the network endpoint 1004 or accepting appliance 1005.

In FIG. 10, and at the event precedent 1010, a signal is conveyed at the network endpoint 1004 or the accepting appliance 1005 to a presenting interactor 1002, indicating that the said method devised in the present invention is a method available at the network endpoint 1004 or accepting appliance 1005 for the presenting interactor 1002, whereby the network endpoint 1004 is equipped with such accepting appliance 1005 and wherein such accepting appliance 1005 is configured to communicate with Server 1001. In effect, the said method devised in the present invention is one of the methods available at the network endpoint 1004 for obtaining credentials from presenting interactor 1002

In FIG. 10, and at the event precedent 1011, a presenting interactor 1002 decides to initiate an interaction at the facility operated at the accepting interactor as per the process of the method devised by the present invention by availing of the presenting appliance 1003 configured to generate and transmit a presenting appliance communication to such server 1001, and availing of an accepting appliance 1005, configured to generate and transmit an accepting appliance communication to such server 1001. In effect, the presenting interactor 1002 selects to initiate an interaction at the facility of the accepting interactor as per the process of the method devised by the present invention, declining to initiate an interaction at the facility operated at the accepting interactor as per any other process of prior methods available at the network endpoint 1004 for obtaining credentials from presenting interactor 1002.

At stage 1012, an interaction is initiated by activating 1012 the accepting appliance 1005 that is configured to facilitate accepting appliance communications with server 1001. On activation at 1012, a once-off shared keycode is produced 1012 at the accepting appliance 1005. In one embodiment of 1012, the shared keycode is generated by the server 1001 and transmitted to the accepting appliance 1005. In another embodiment of 2012, the shared keycode is generated at the accepting appliance 1005.

At stage 1013, an interaction is initiated by activating 1013 the presenting appliance 1003 that facilitates presenting appliance communications with server 1001. On activation at 1013, a presenter identifier is retrieved from a storage location on the presenting appliance 1003. In one embodiment at 1013, a list of aliases associated to the credentials connected the presenting interactor 1002 related to the presenter identifier also retrieved from some storage location on the presenting appliance 1003. In such embodiment of 1012, such a list of aliases associated to the credentials connected the presenting interactor are itemized on the presenting peripheral 1003 for selection by the presenter identifier 1002.

At stage 1014, a shared keycode is rendered available 1014 at the accepting appliance 1005 to presenting interactor 1002 and presenting appliance 1003. In one embodiment of 1014, it is rendered human-readable at accepting appliance 1005. In another embodiment of 1014, it is rendered machine-readable at accepting appliance 1005.

At stage 1015, the shared keycode is obtained accordingly 1015 at the presenting appliance 1003. In one embodiment of 1015, it is obtained by reading it at the accepting appliance 1005 and inputting it in to the presenting appliance 1003. In another embodiment of 1015 it is obtained by scanning it at the accepting appliance 1005 and capturing it on to the presenting appliance 1003. In one embodiment, the accepting appliance 1005 transmits the once-off shared keycode directly 1014 to the presenting appliance 1003, whereas in another embodiment, the accepting appliance 1005 makes the shared keycode available 1014 to the presenting interactor 1002, who enters it 1016 into the presenting appliance 1003. In some embodiments of the invention, a validity period may be assigned to the shared keycode. This ensures that if a received accepting appliance communication and a received presenting appliance communication are not corroborated within a certain timeframe by seeking to match the once-off shared keys (as discussed further below) within a certain timeframe (the validity period), then the interaction may lapse and thereby become void rendering further processes redundant. Upon expiry of the validity period of a shared keycode, the same shared keycode thus may be re-used in a subsequent iteration of the method. Accordingly, a validity period can ensure that shorter, less complex secret keys can be used because shared keycode re-use is thereby feasible. This is advantageous in embodiments of the invention where it is necessary for the presenting interactor to enter the shared keycode into the presenting peripheral, as reduced keycode complexity makes this embodiment of the method more manageable.

In some embodiments, the presenting appliance may also display a list of aliases pertaining to different presenter credential sets connected to said presenting interactor. The presenting interactor then selects an alias associated to the desired credential set connected to the presenting interactor.

At stage 1016, the accepting appliance seeks to obtain the secret keycode of the presenting interactor by prompting the presenting interactor 1002 to enter the presenter's secret keycode on the accepting appliance 1005. In one embodiment, the accepting appliance 1005 may additionally display at 1012 a predetermined auxiliary parameter to the presenting interactor 1002 in order to further correlate the interaction and corroborate the accepting appliance communication and the presenting appliance communication.

At 1017, the secret keycode is obtained 1017 by the accepting appliance 1005. In one embodiment, the presenting interactor 1002 uses a keypad to enter the secret keycode on the accepting appliance 1005. In another embodiment, the presenter interactor 1002 may use a device to convey the secret keycode to the accepting appliance 1005.

At stage 1019, the accepting appliance 1005 then transmits an accepting appliance communication to the server 1001 permitting release of a specific credential set(s) connected to the presenting interactor 1003 to the facility of the recipient permitted by the presenting interactor 1002. The accepting appliance communication contains the presenter's secret keycode as obtained at 1017 and the once-off shared keycode as generated at 1012. The accepting appliance communication may also contain an identifier pertaining to the accepting interactor if retrieved following 1012 and any auxiliary predetermined parameters if captured following 1012.

At stage 1018, the presenting appliance 1003 transmits a presenting appliance communication to the server 1001 allowing retrieval of the specific credential set(s) connected to the presenting interactor 1002, in storage at the location identified by the presenting interactor 1002. The presenting appliance communication contains a presenter identifier retrieved in 1013 and the once-off shared keycode obtained at 1015. The presenting appliance communication may also contain an alias associated to the chosen credential set if itemized at 1013 and selected at 1016, and may also contain any predetermined auxiliary parameters if captured following 1016.

At 1020, the server 1001 seeks to match the received accepting appliance communications and received presenting appliance communications by seeking to match the once-off shared keycode contained in accepting appliance communications and the once-off shared keycode contained in presenting appliance communications. In some embodiments of 1020, the accepting appliance communication and/or the presenting appliance communication may be assigned a validity period 1020. If the accepting appliance communication and presenting appliance communications are not matched within the designated validity period, the interaction lapses and is deemed void rendering further processes redundant. Where an interaction lapses and becomes void rendering further processes redundant, the data pertaining to the interaction (i.e. the interactor communications) can be purged from the system, freeing up resources for the processing of further received permissions. In other embodiments of 1020, a value or predetermined auxiliary parameters may have been contained in the accepting appliance communication in 1019 and presenting appliance communication in 1018. If so, the value is used in addition to shared keycode as the predetermined auxiliary parameter to seek a match of an accepting appliance communication and presenting appliance communication in 1020.

At stage 1021, and in the event a match is found at 1020, the server 1001 initiates a search by linking 1021 the presenting identifier contained in the presenting appliance communication and the secret keycode contained in the accepting appliance communication, wherein the shared keycode contained in the presenting appliance communication is the same as the shared keycode contained in the accepting appliance communication as per 1020. If no match is found at 1020, the method does not thus proceed with 1021, and the Server 1001 may return a message accordingly to the accepting appliance 1005 or the presenting appliance 1003.

At stage 1022, the server 1001 conducts 1022 a search for a target record within its collection of presenter records comprising the presenter identifier contained in the matched presenting appliance communication and the secret keycode contained in the matched accepting appliance communication. In one embodiment of 1022, and in the event 1022 an alias associated to the presenter identifier is contained in the presenting appliance communication as per 1018, the alias is also used to ascertain 1022 a target record comprising that alias in addition to the presenter identifier and secret keycode of the presenting interactor 1002.

At stage 1023, and in the event a record comprising the presenter identifier and presenter's secret keycode is located in 1022, a search is continued by identifying 1023 an entry affiliated to the target record located in 1022, wherein the entry pertains to the set of credentials connected to the presenting interactor 1002. (In one embodiment, the credential set concerned may be the credential set connected to the alias selected by the presenting interactor at step 1022). In one embodiment, the entry identified contains 1022 a reading comprising the credentials connected to the presenting interactor 1002. In another embodiment, the entry identified contains 1022 a pointer locating the credentials connected to the presenting interactor 1002. In the event a record comprising the presenter identifier and presenter's secret keycode is not located in step 1022, the process does not thus proceed with 1023 and the Server 1001 may return a message accordingly to the accepting appliance 1005 or/and the presenting appliance 1003.

At 1024, a search is completed by permitting a retrieval of a reading of the credentials connected to the presenting interactor 1002 in storage at the location identified in 1023, and permitting a release of the reading of the credentials connected to the presenting interactor to the facility of the recipient permitted by the presenting interactor 1002.

At stage 1025, a reading is retrieved from storage at the location indicated by the presenting interactor 1002. In one embodiment, a reading is stored and retrieved 1025 at the controlling server configured to perform the method devised in 1020 to 1024. In another embodiment, a reading is stored and retrieved 1025 at another server different to the controlling server configured to perform the method devised in 1020 to 1024.

At stage 1026, a reading of the credentials is released 1026 to the facility of the recipient permitted by the presenting interactor 1002. In one embodiment of 1026, the reading is released and dispatched to the network endpoint 1004. In another embodiment of 1026, the reading is released and dispatched to the accepting appliance 1005.

In FIG. 10, and as the events subsequent at 1027 and 1028, a message is returned by the server 1001 to the presenting appliance 1003 for the presenting interactor 1002, indicating if the reading has been retrieved as identified and released as permitted by the presenting interactor 1002; in such supplemental embodiments, a recording is retained at the server 1001 listing a status of events occurring between 1020 and 1024, ad reviewable to the presenting interactor 1002 at the presenting appliance 1003.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

What is claimed is:

1. A system for permitting a communication of at least one set of controlled credentials connected to a presenter from a server to a network endpoint, said system comprising:
    at least one network endpoint;
    at least one accepting appliance configured to send an accepting appliance communication, said accepting appliance communication containing a secret keycode pertaining to said presenter and a once-off shared keycode, and said accepting appliance comprising an accepting appliance processor, an accepting appliance communication interface, accepting appliance memory, and at least one of an accepting appliance input console and an accepting appliance output console;
    at least one presenting appliance configured to send a presenting appliance communication, said presenting appliance communication containing a presenter identifier pertaining to said presenter and said once-off shared keycode, and said presenting appliance comprising a presenting appliance processor, a presenting appliance communication interface, presenting appliance memory, and at least one of a presenting appliance input console and a presenting appliance output console;
    at least one server that further-comprises a server processor, at least one server communications interface, and server memory storing at least one entry pertaining to said at least one set of connected controlled credentials, each entry being affiliated to at least one record, the record pertaining to any one presenter and comprises a presenter identifier and a secret keycode bound to the presenter identifier;
    wherein said at least one server is configured to:
    a) receive said accepting appliance communication;
    b) receive said presenting appliance communication;
    c) seek a match of said once-off shared keycode contained in said accepting appliance communication with said once-off shared keycode contained in said presenting appliance communication;
    d) initiate a search for a target record by linking the secret keycode in said accepting appliance communication with said presenter identifier in said presenting appliance communication, both said accepting appliance communication and said presenting appliance communication containing the same once-off shared keycode;
    e) conduct the search for said target record that comprises both said secret keycode and said presenter identifier;
    f) identify an entry affiliated with said target record;
    g) permit the retrieval of said at least one set of connected controlled credentials pertaining to said entry and permit the release of said at least one set of connected controlled credentials to said network endpoint, said network endpoint being a permitted recipient of a type of said at least one set of connected controlled credentials.

2. The system of claim 1, wherein said at least one server comprises a controlling server.

3. The system of claim 2, wherein the controlling server is further configured to generate said once-off shared keycode, and render it available at the accepting appliance.

4. The system of claim 3, wherein said presenting appliance is further configured to receive said once-off shared keycode from said accepting appliance, retrieve said presenter identifier from its memory and transmit said presenting appliance communication to said controlling server.

5. The system of claim 2, wherein said accepting appliance is further configured to generate said once-off shared keycode, receive said secret keycode from said presenter and transmit said accepting appliance communication to said controlling server.

6. The system of claim 2, wherein said at least one set of connected controlled credentials comprises an entry in said target record on said controlling server.

7. The system of claim 2, wherein said at least one set of connected controlled credentials comprises an entry on another of said at least one server which is affiliated to said target record on said controlling server.

8. The system of claim 2, wherein, if said records comprise entries of at least one set of connected controlled credentials on said controlling server, steps f) and g) are performed at said controlling server, and communication of said at least one set of connected controlled credentials is performed from said controlling server.

9. The system of claim 2, wherein, if said records comprise entries of at least one set of connected controlled credentials on a different server than said controlling server, steps f) and g) are performed at said different server, and communication of said at least one set of connected controlled credentials is performed using one of: said controlling server and said different server.

10. The system of claim 1, wherein said record comprising said presenter identifier and said secret keycode further comprises an alias associated to the presenter identifier and affiliated to said entry pertaining to said at least one set of connected controlled credentials.

11. The system of claim 1, wherein said presenting appliance communication further contains an alias associated to said presenter identifier and affiliated to said entry pertaining to said at least one set of connected controlled credentials, and wherein said search for said target record further utilizes said alias contained in said presenting appliance communication to search for said target record comprising said alias in addition to comprising said presenter identifier and said secret keycode.

12. The system of claim 1, wherein said network endpoint comprises said accepting appliance and is configured as a designated recipient of one or more types of said at least one set of connected controlled credentials.

13. The system of claim 1, wherein said network endpoint is linked to said accepting appliance and is configured as a designated recipient of one or more types of said at least one set of connected controlled credentials.

14. The system of claim 1, wherein a validity period is assigned to said accepting appliance communication, and wherein step c) further comprises establishing whether said validity period has expired.

15. The system of claim 4, wherein a validity period is assigned to said presenting appliance communication, and wherein step c) further comprises establishing whether said validity period has expired.

16. The system of claim 1, wherein a validity period is assigned to said once-off shared keycode, and wherein step c) further comprises establishing whether said validity period has expired.

17. The system of claim 16, wherein said once-off shared keycode is unique over the duration of its validity period.

18. The system of claim 1, wherein said accepting appliance communication further contains one or more predetermined auxiliary parameters, and said presenting appliance communication also further comprises said one or more predetermined auxiliary parameters.

19. The system of claim 18, wherein said controlling server seeks to match at least one of said predetermined auxiliary parameters from said presenting appliance communication with said corresponding predetermined auxiliary parameter(s) from said accepting appliance communication to provide further at least one of: correlation and corroboration.

20. The system of claim 1, wherein, if no match between said accepting appliance communication and presenting appliance communication is found at said controlling server, said controlling server terminates further configured actions and records such status thereat.

21. The system of claim 1, wherein, if no target record is found at said controlling server, said controlling server terminates further configured actions and records such status thereat.

22. The system of claim 1, wherein said controlling server is further configured to record the status of the events occurring and to relay such status to at least one of: said accepting appliance and said presenting appliance.

23. The system of claim 1, wherein each network endpoint comprises a network endpoint processor, a network endpoint communication interface, network endpoint memory, and at least one of a network endpoint input console and a network endpoint output console.

24. The system of claim 1, wherein the system is operable over a communications network.

25. A method to permit a communication of at least one set of controlled credentials connected to a presenter from at least one server to a network endpoint, said method comprising the following steps performed by at least one server:
(a) receiving, from an accepting appliance, an accepting appliance communication, said communication containing a secret keycode pertaining to said presenter and a once-off shared keycode, and said accepting appliance comprising an accepting appliance processor, an accepting appliance communication interface, accepting appliance memory, and at least one of an accepting appliance input console and an accepting appliance output console;
(b) receiving, from a presenting appliance a presenting appliance communication, said communication containing a presenter identifier pertaining to said presenter and once-off shared keycode, and said presenting appliance comprising a presenting appliance processor, a presenting appliance communication interface, presenting appliance memory, and at least one of a presenting appliance input console and a presenting appliance output console;
(c) seeking, by at least one server processor of the at least one server, a match of said once-off shared keycode contained in said accepting appliance communication and said once-off shared keycode contained in said presenting appliance communication;
(d) initiating, by the at least one server processor, a search for a target record by linking said secret keycode of said accepting appliance communication and said presenter identifier in said presenting appliance communication, both said accepting appliance communication and said presenting appliance communication containing the same once-off shared keycode;
(e) conducting, by the at least one server processor, the search for the target record comprising both said secret keycode and said presenter identifier;
(f) identifying, by the at least one server processor, an entry affiliated with said target record, said entry pertaining to said at least one set of connected controlled credentials; and
(g) permitting, by the at least one server processor, a retrieval of said at least one set of connected controlled credentials pertaining to said entry and permitting a release of said set of connected controlled credentials to said network endpoint, said endpoint being a permitted recipient of said at least one set of connected controlled credentials.

26. The method of claim 25, wherein the target record comprising said presenter identifier and secret keycode further comprises an alias associated to said presenter identifier and affiliated to said entry pertaining to said at least one set of connected controlled credentials, and said presenting appliance communication further contains an alias associated to said presenter identifier and affiliated to said entry pertaining to said at least one set of connected controlled credentials, and wherein step (e) further comprises matching respective aliases of said record and said presenting appliance communication.

27. The method of claim 25, wherein said at least one server comprises a controlling server and steps (a) to (g) are performed thereon.

28. The method of claim 27, wherein, if said records comprise entries of at least one set of connected controlled credentials on said controlling server, performing the steps (f) and (g) at said controlling server, and the method further comprises releasing said at least one set of connected controlled credentials from said controlling server.

29. The method of claim 27, wherein, if no match between said accepting appliance communication and presenting appliance communication is found, terminating further configured actions and recording such status at said controlling server.

30. The method of claim 27, wherein, if no target record is found, terminating further configured actions and recording such status at said controlling server.

31. The method of claim 27, further comprising recording the status of the events at said controlling server and relaying such status to at least one of: said accepting appliance and said presenting appliance.

32. The method of claim 25, wherein said at least one server comprises a controlling server and said at least one set of connected controlled credentials comprises an entry on a different server to said controlling server, said entry being affiliated with said target record, and wherein the step of identifying a credential set is performed at said different server, and wherein steps (e) to (g) are performed at one of: said controlling server and a different server.

33. The method of claim 25, further comprising assigning a validity period to at least one of: said accepting appliance communication, said presenting appliance communication and said once-off shared keycode, and step (c) further comprises establishing whether said validity period has expired.

34. The method of claim 33, wherein said once-off shared keycode is unique over the duration of its validity period.

35. The method of claim 25, wherein each of said presenting appliance communication and said accepting appliance communication further contains one or more predetermined auxiliary parameters, and wherein step (c) further comprises seeking a match of at least one of said predetermined auxiliary parameters in said presenting appliance communication with at least one of corresponding predetermined auxiliary parameters in said accepting appliance communication.

36. The method of claim 25, wherein said at least one server comprises a controlling server, and, if said records comprise entries of at least one set of connected controlled credentials on a different server to said controlling server, performing the steps (f) and (g) at said different server, and the method further comprises releasing said at least one set of connected controlled credentials from one of: said controlling server and said different server.

* * * * *

UNITED STATES PATENT AND TRADEMARK OFFICE
CERTIFICATE OF CORRECTION

PATENT NO. : 10,021,093 B2
APPLICATION NO. : 15/110357
DATED : July 10, 2018
INVENTOR(S) : Gerard Barry and Declan Barry Page 1 of 1

It is certified that error appears in the above-identified patent and that said Letters Patent is hereby corrected as shown below:

In the Claims

Column 21,
Line 51, In Claim 1, "further-comprises", should read --comprises--;

Column 23,
Line 9, In Claim 15, "claim 4", should read --claim 1--.

Signed and Sealed this
Fourteenth Day of May, 2019

Andrei Iancu
*Director of the United States Patent and Trademark Office*